(12) United States Patent
Scancarello et al.

(10) Patent No.: US 10,634,143 B2
(45) Date of Patent: *Apr. 28, 2020

(54) THERMAL AND SOUND OPTIMIZED LATTICE-CORED ADDITIVE MANUFACTURED COMPRESSOR COMPONENTS

(71) Applicant: Emerson Climate Technologies, Inc., Sidney, OH (US)

(72) Inventors: Marc J. Scancarello, Troy, OH (US); Robert C. Stover, Versailles, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 335 days.

This patent is subject to a terminal disclaimer.

(21) Appl. No.: 15/366,885

(22) Filed: Dec. 1, 2016

(65) Prior Publication Data

US 2017/0184108 A1   Jun. 29, 2017

Related U.S. Application Data

(60) Provisional application No. 62/387,118, filed on Dec. 23, 2015.

(51) Int. Cl.
*F04C 29/06* (2006.01)
*F04C 29/04* (2006.01)
(Continued)

(52) U.S. Cl.
CPC ............ *F04C 29/063* (2013.01); *B23P 15/00* (2013.01); *B33Y 10/00* (2014.12); *B33Y 70/00* (2014.12);
(Continued)

(58) Field of Classification Search
CPC ......... B23P 15/00; B33Y 10/00; B33Y 70/00; F04C 29/04; F04C 29/063
See application file for complete search history.

(56) References Cited

U.S. PATENT DOCUMENTS

| 4,097,195 A | 6/1978 | Hill |
| 5,320,506 A | 6/1994 | Fogt |

(Continued)

FOREIGN PATENT DOCUMENTS

| CN | 1118041 A | 3/1996 |
| CN | 1315586 A | 10/2001 |

(Continued)

OTHER PUBLICATIONS

Omnexus, Polyetherimide (PEI): A Comprehensive Review, https://omnexus.specialhem.com/selection-guide/polyetherimide-pei-high-heat-plastic, Printed Jun. 26, 2019, pp. 1-4 (Year: 2019).*

(Continued)

*Primary Examiner* — Mary Davis
(74) *Attorney, Agent, or Firm* — Harness, Dickey & Pierce, P.L.C.

(57) ABSTRACT

A light-weight, high-strength insulating compressor component formed via additive manufacturing is provided. The component may have at least one interior region comprising a lattice structure that comprises a plurality of repeating cells. A solid surface is disposed over the lattice structure. The interior region comprising the lattice structure minimizes or reduces transmission of at least one of thermal energy, sound, or vibrational energy through the component. Methods of making such compressor components via additive manufacturing processes are also provided.

10 Claims, 19 Drawing Sheets

(51) Int. Cl.
*F04C 18/02* (2006.01)
*B33Y 10/00* (2015.01)
*B33Y 70/00* (2020.01)
*B33Y 80/00* (2015.01)
*B23P 15/00* (2006.01)

(52) U.S. Cl.
CPC .......... *B33Y 80/00* (2014.12); *F04C 18/0215* (2013.01); *F04C 18/0246* (2013.01); *F04C 29/04* (2013.01); *F04C 2230/20* (2013.01); *F05C 2201/021* (2013.01); *F05C 2201/0412* (2013.01); *F05C 2253/083* (2013.01); *F05C 2253/14* (2013.01)

(56) References Cited

U.S. PATENT DOCUMENTS

| | | | |
|---|---|---|---|
| 5,556,270 | A | 9/1996 | Komine et al. |
| 5,594,216 | A | 1/1997 | Yasukawa et al. |
| 5,716,202 | A | 2/1998 | Koyama et al. |
| 5,842,842 | A | 12/1998 | Callens et al. |
| 6,841,011 | B2 | 1/2005 | Lin |
| 6,918,970 | B2 | 7/2005 | Lee et al. |
| 7,540,710 | B2 | 6/2009 | Grote et al. |
| 7,601,148 | B2 | 10/2009 | Keller |
| 7,623,940 | B2 | 11/2009 | Huskamp et al. |
| 8,104,799 | B2 | 1/2012 | Huskamp et al. |
| 8,650,756 | B2 * | 2/2014 | Wadley ................ B21D 47/00 29/897 |
| 8,826,938 | B2 | 9/2014 | Moore |
| 9,605,677 | B2 | 3/2017 | Heidecker et al. |
| 10,281,053 | B2 * | 5/2019 | Griffin, Jr. ............. B33Y 30/00 |
| 2008/0138648 | A1 | 6/2008 | Halberstadt et al. |
| 2010/0202910 | A1 | 8/2010 | Yamamoto et al. |
| 2011/0268580 | A1 | 11/2011 | Bryk et al. |
| 2012/0213659 | A1 | 8/2012 | Bayer et al. |
| 2013/0011269 | A1 * | 1/2013 | Gainnozzi ......... B29C 45/14065 416/223 R |
| 2013/0064661 | A1 | 3/2013 | Evans et al. |
| 2013/0233526 | A1 * | 9/2013 | Hislop .................. B22F 3/1055 165/168 |
| 2013/0280049 | A1 | 10/2013 | Fisk et al. |
| 2014/0010679 | A1 | 1/2014 | Rice et al. |
| 2014/0182292 | A1 | 7/2014 | Hudon et al. |
| 2014/0202163 | A1 | 7/2014 | Johnson et al. |
| 2015/0035392 | A1 | 2/2015 | Pal |
| 2015/0052898 | A1 | 2/2015 | Erno et al. |
| 2015/0064015 | A1 | 3/2015 | Perez |
| 2015/0080495 | A1 | 3/2015 | Heikkila |
| 2015/0276287 | A1 | 10/2015 | Cosby, II et al. |
| 2015/0345304 | A1 | 12/2015 | Mongillo et al. |
| 2015/0345396 | A1 | 12/2015 | Zelesky et al. |
| 2016/0082628 | A1 * | 3/2016 | Yang ...................... B29C 44/352 428/220 |
| 2016/0151829 | A1 * | 6/2016 | Propheter-Hinckley ..................... F01D 5/147 164/529 |
| 2016/0279885 | A1 * | 9/2016 | Cantwell ................ B29C 70/16 |
| 2016/0341249 | A1 * | 11/2016 | Yang ...................... F04C 29/02 |
| 2017/0182561 | A1 | 6/2017 | Scancarello et al. |
| 2017/0184086 | A1 | 6/2017 | Scancarello et al. |
| 2017/0234143 | A1 * | 8/2017 | Snyder ................... B33Y 80/00 165/51 |
| 2018/0038385 | A1 * | 2/2018 | Welch ..................... B64C 11/26 |

FOREIGN PATENT DOCUMENTS

| | | | |
|---|---|---|---|
| CN | 1612760 | A | 5/2005 |
| CN | 1643171 | A | 7/2005 |
| CN | 1807090 | A | 7/2006 |
| CN | 103967837 | A | 8/2014 |
| CN | 104662199 | A | 5/2015 |
| EP | 2762252 | A1 | 8/2014 |
| WO | WO-2013142502 | A1 | 9/2013 |
| WO | WO-2014155039 | A1 | 10/2014 |
| WO | WO-2014158600 | A1 | 10/2014 |
| WO | WO-2017112405 | A2 | 6/2017 |
| WO | WO-2017112406 | A1 | 6/2017 |
| WO | WO-2017112407 | A1 | 6/2017 |

OTHER PUBLICATIONS

Feih, Stefanie et al. "Advanced 3D metallic lattice structures for composite sandwich materials." [online] [retrieved on Sep. 8, 2018] Retrieved from the Internet: <URL: http://www.a-star.edu.sg/Portals/0/uploads/AGA/2015-ags/cambridge/Advanced%203D%20metallic%20lattice%20structures%20for%20composite%20sandwich%20materials.pdf>.

Mun, Jiwon et al. "Indirect Additive Manufacturing of a Cubic Lattice Structure with a Copper Alloy." *Proceedings of the Twenty-Fifth annual International Solid Freeform Fabrication (SFF) Symposium—An Additive Manufacturing Conference*, Austin, Texas, Aug. 4-6, 2014. [online] [retrieved on May 12, 2015]. Retrieved from the Internet: <URL: sffsymposium.engr.utexas.edu/sites/default/files/2014-055-Mun.pdf>, pp. 665-687.

Rosen, David et al. "Design of General Lattice Structures for Lightweight and Compliance Applications," *Proceedings of the Rapid Manufacturing Conference*, Loughborough, UK, Jul. 5-6, 2006. [online] [retrieved on May 12, 2015]. Retrieved from the Internet: <URL: http://hdl.handle.net/1853/33037>.

International Search Report regarding International Application No. PCT/US2016/065166, dated Mar. 22, 2017.

Written Opinion of the International Searching Authority regarding International Application No. PCT/US2016/065166, dated Mar. 22, 2017.

International Preliminary Report on Patentability regarding International Patent Application No. PCT/US2016/065166 dated Jun. 26, 2018.

International Search Report regarding International Application No. PCT/US2016/065164, dated Mar. 21, 2017.

Written Opinion of the International Searching Authority regarding International Application No. PCT/US2016/065164, dated Mar. 21, 2017.

International Preliminary Report on Patentability regarding International Patent Application No. PCT/US2016/065164 dated Jun. 26, 2018.

International Search Report regarding International Application No. PCT/US2016/065167, dated Mar. 20, 2017.

Written Opinion of the International Searching Authority regarding International Application No. PCT/US2016/065167, dated Mar. 20, 2017.

International Preliminary Report on Patentability regarding International Patent Application No. PCT/US2016/065167 dated Jun. 26, 2018.

First Office Action for Chinese Patent Application No. 201680081159.8 dated Mar. 8, 2019 with English language translation provided by Unitalen Attorneys at Law, 19 pages.

First Office Action for Chinese Patent Application No. 201680081473.6 dated Mar. 15, 2019 with English language translation provided by Unitalen Attorneys at Law, 19 pages.

First Office Action for Chinese Patent Application No. 201680081457.7 dated Mar. 15, 2019 with English language translation provided by Unitalen Attorneys at Law, 20 pages.

\* cited by examiner

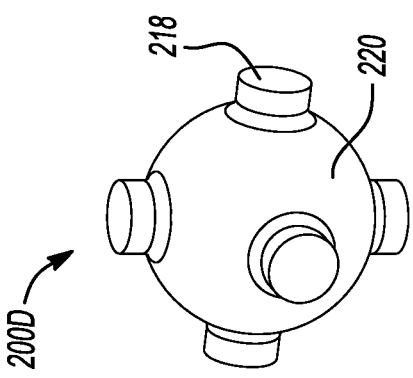
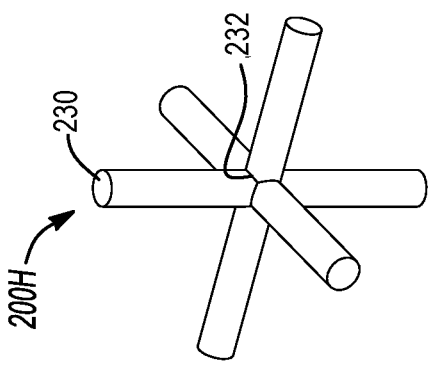
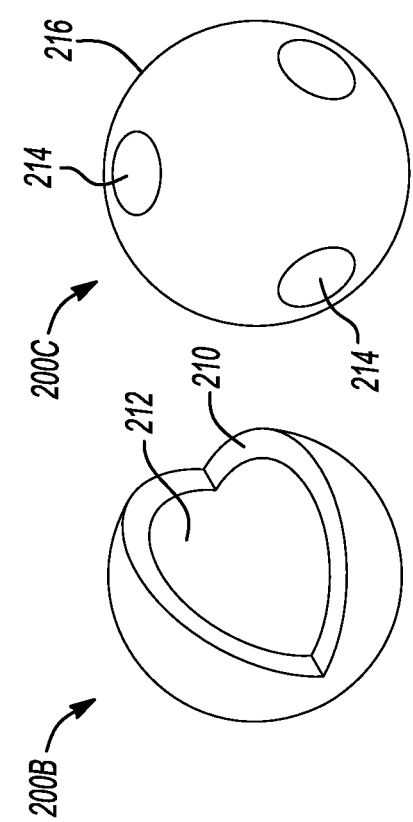
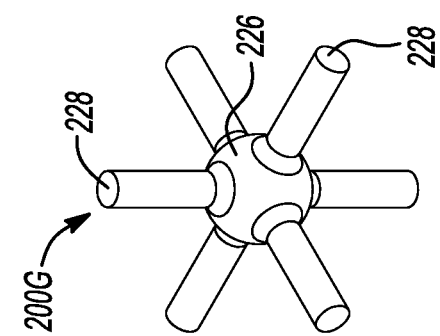
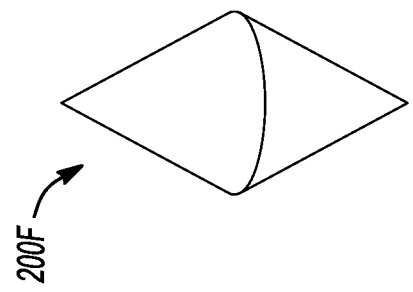
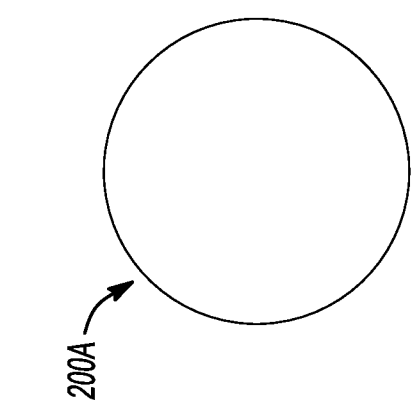
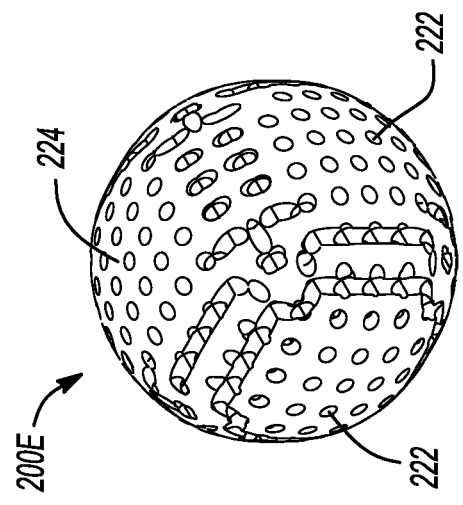

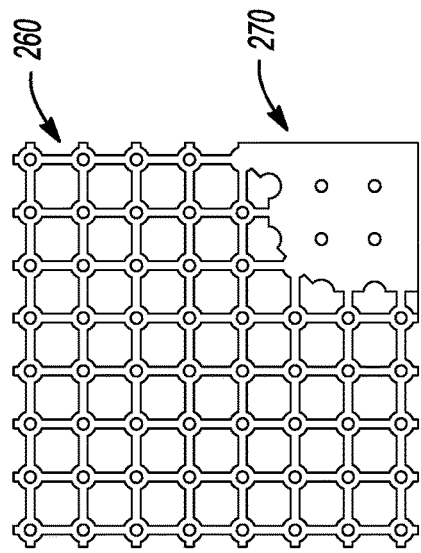
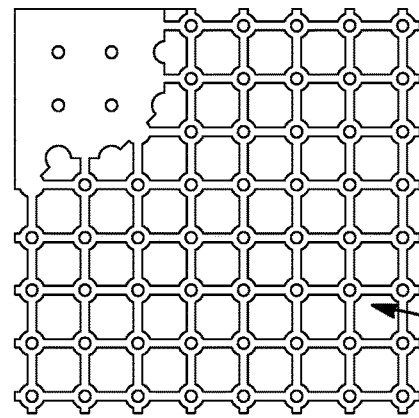
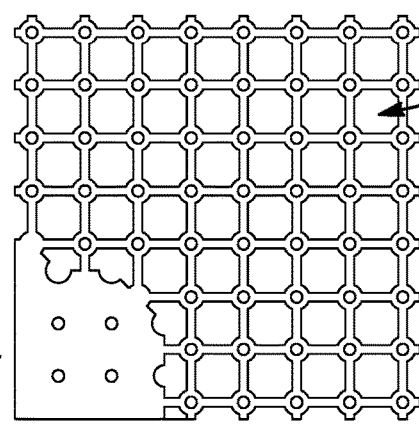
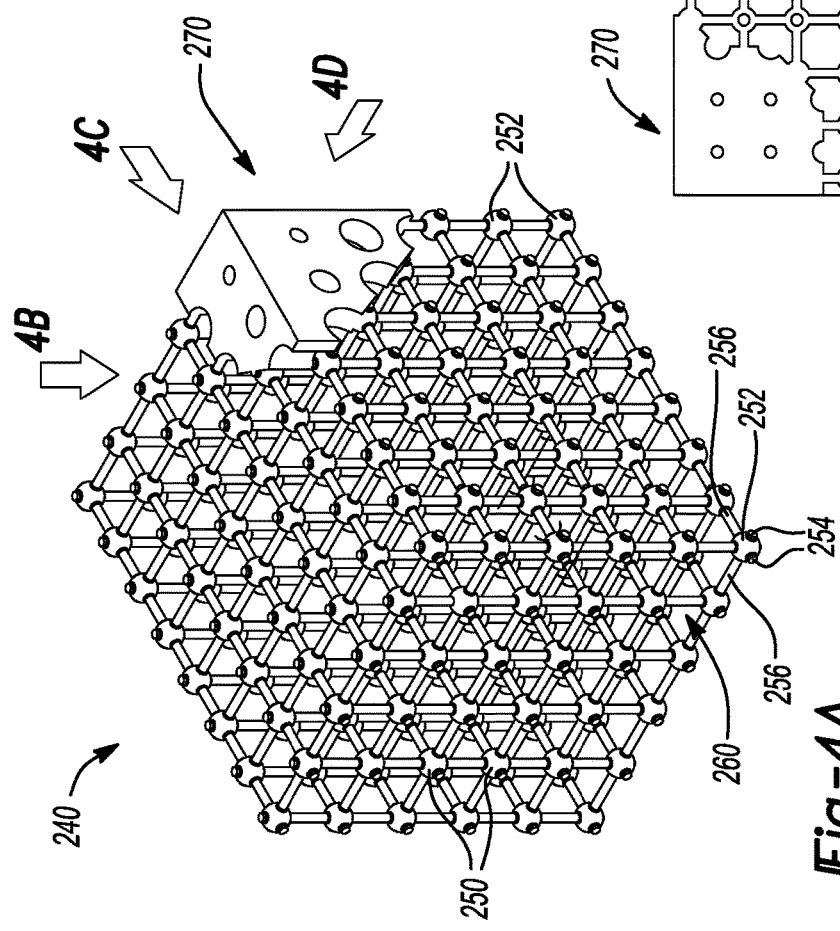

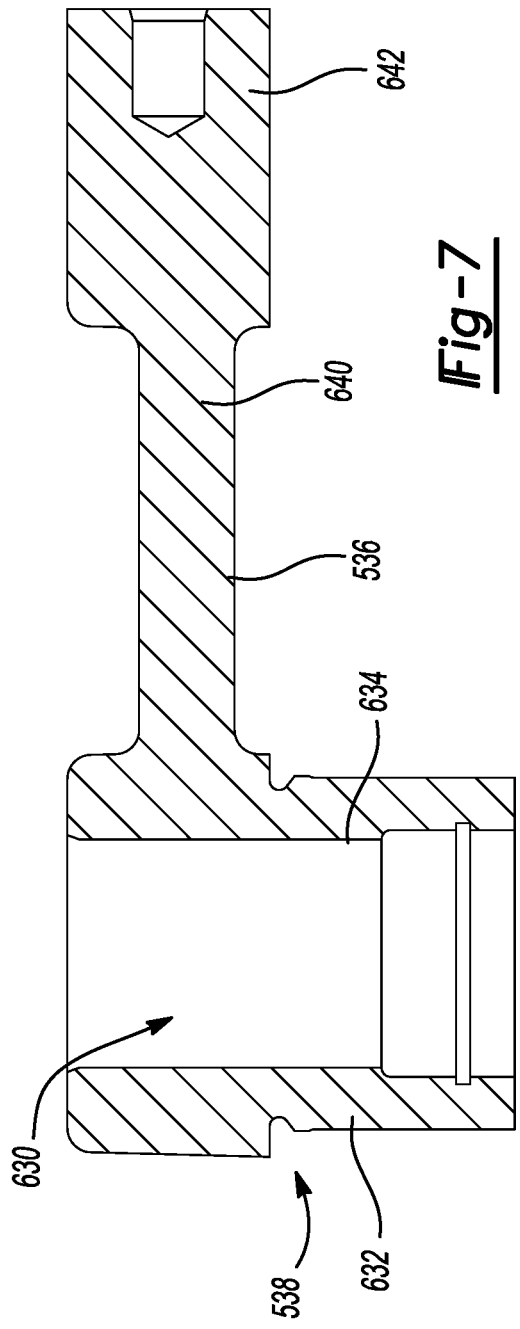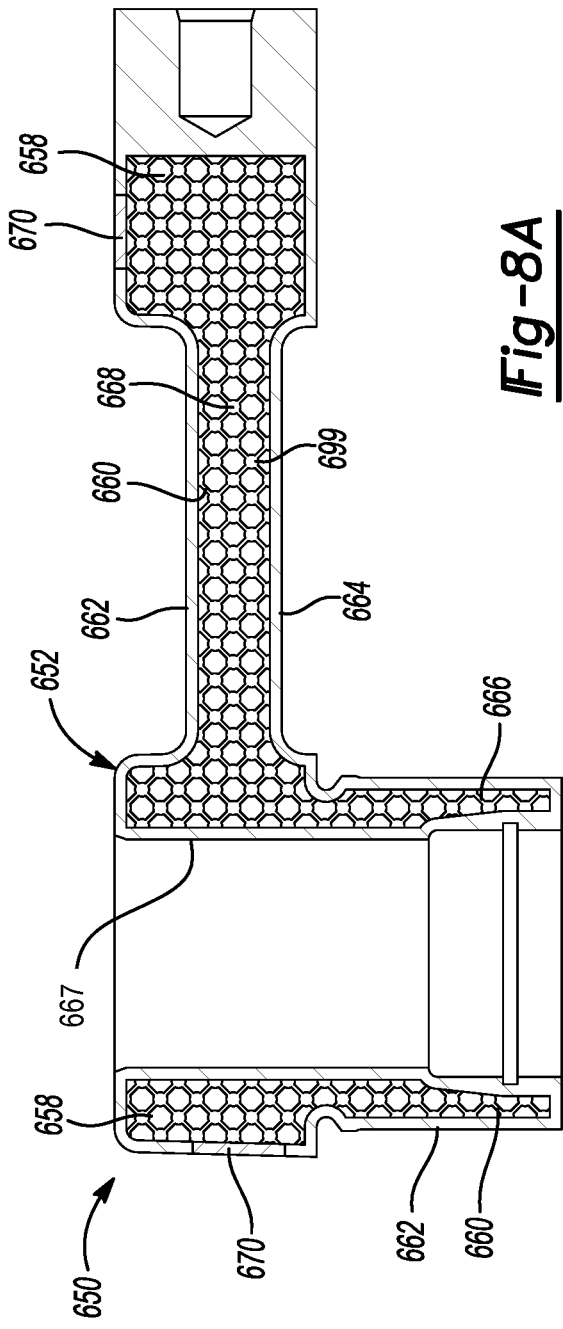

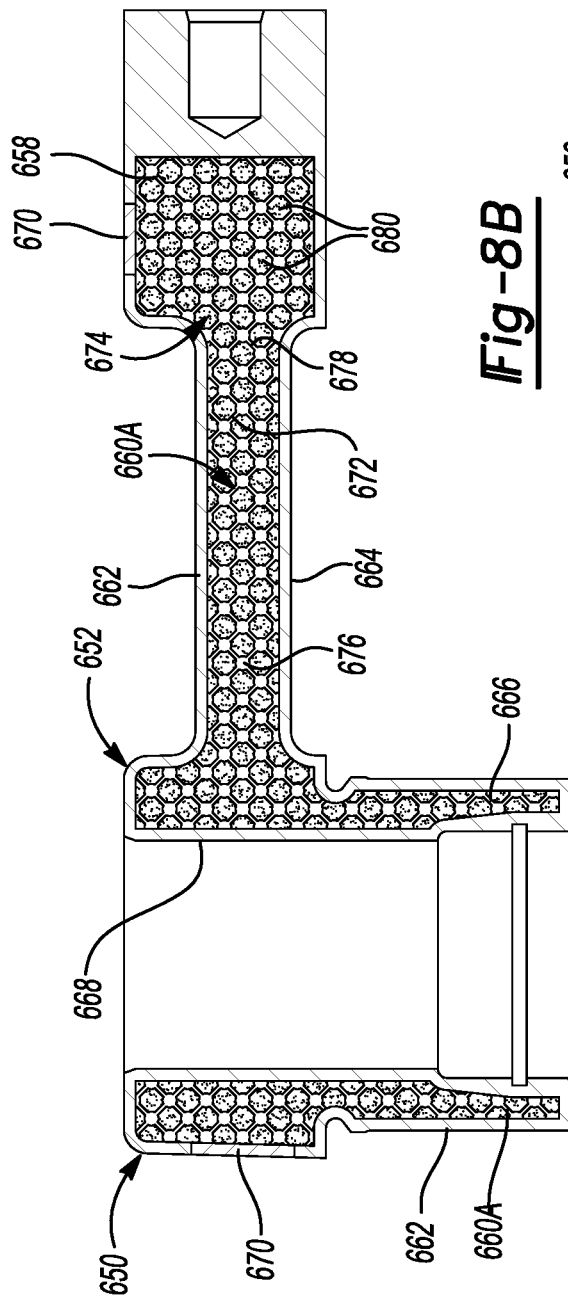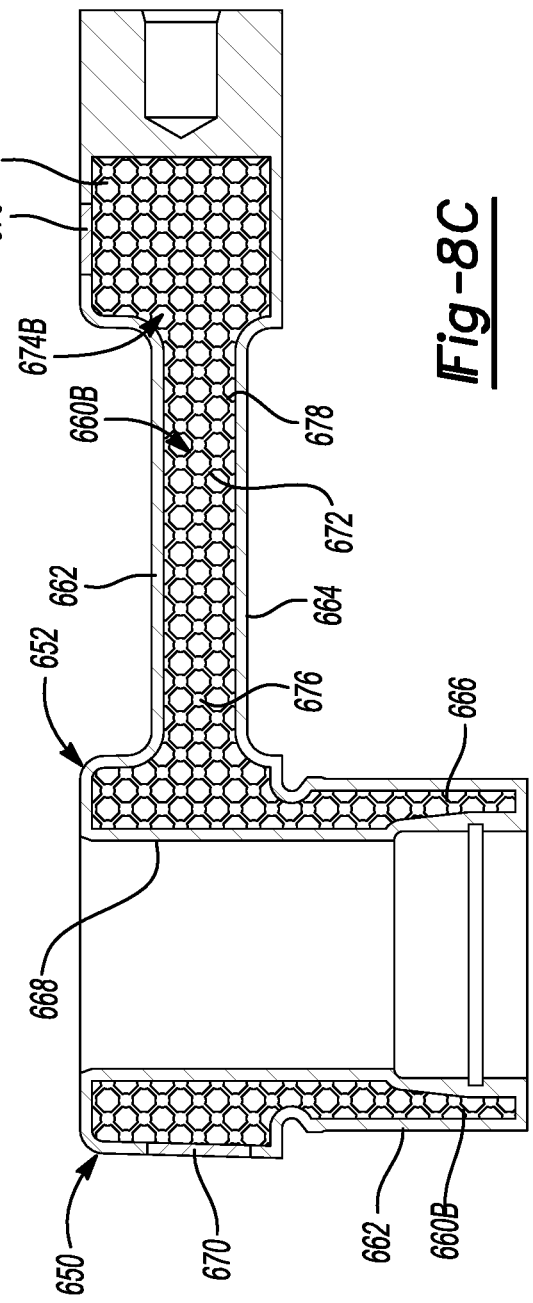

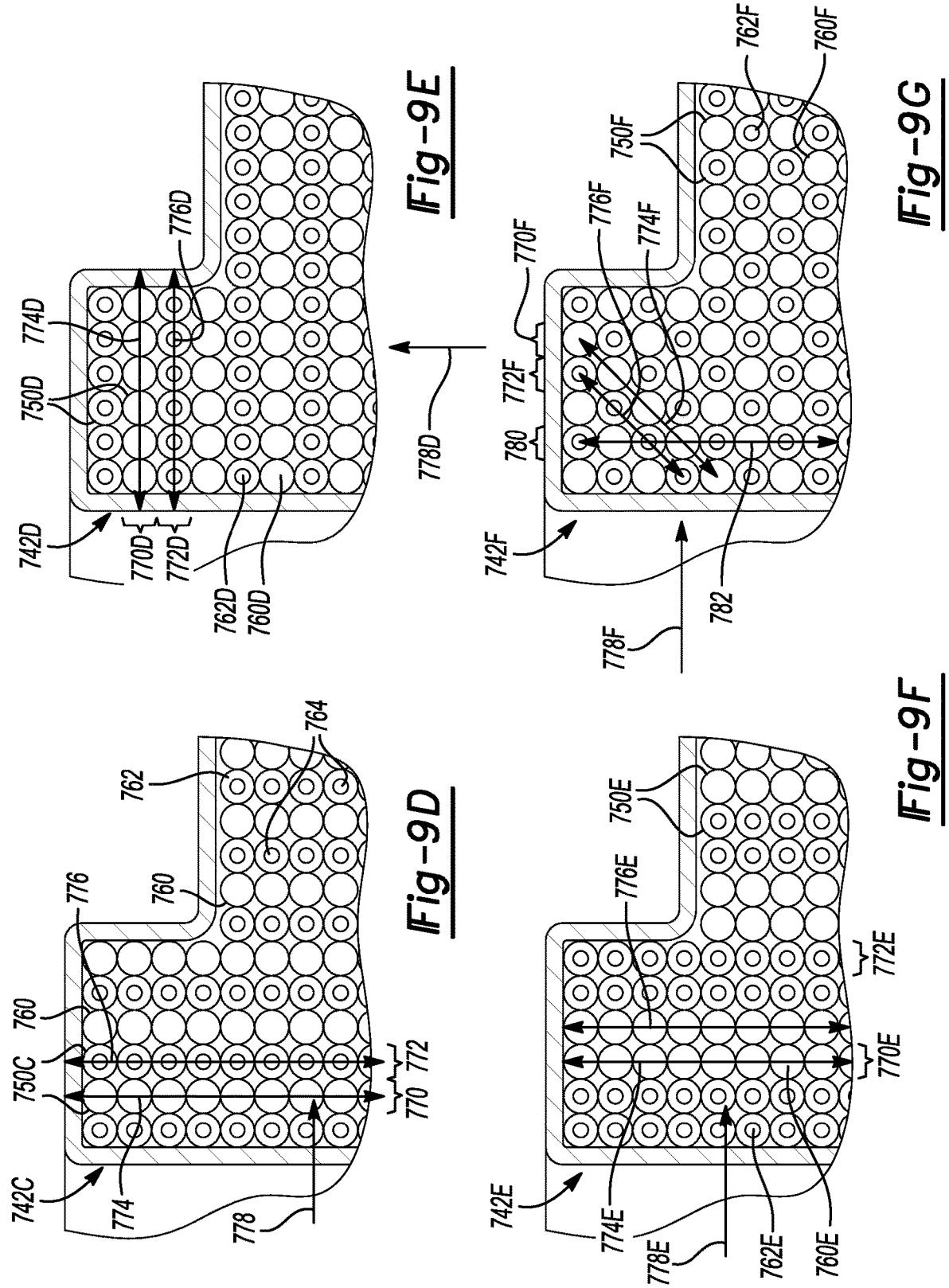

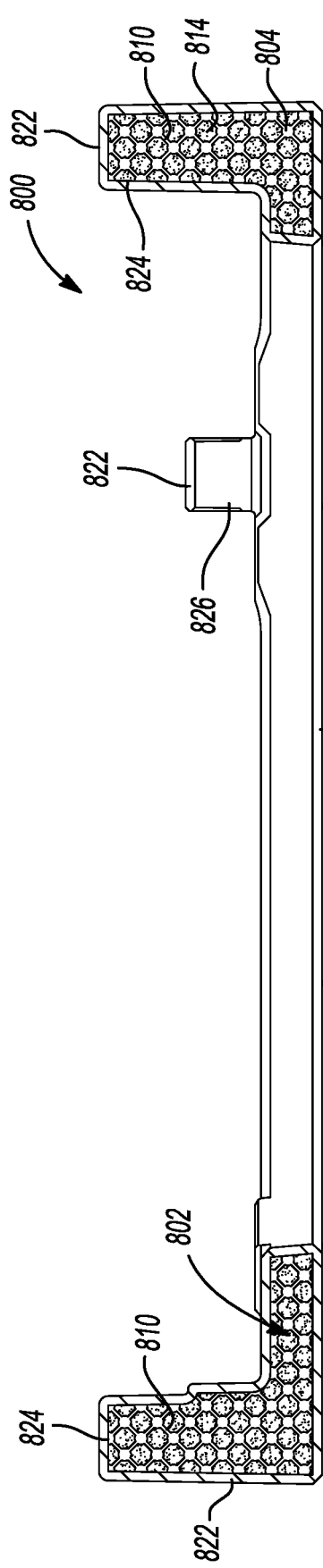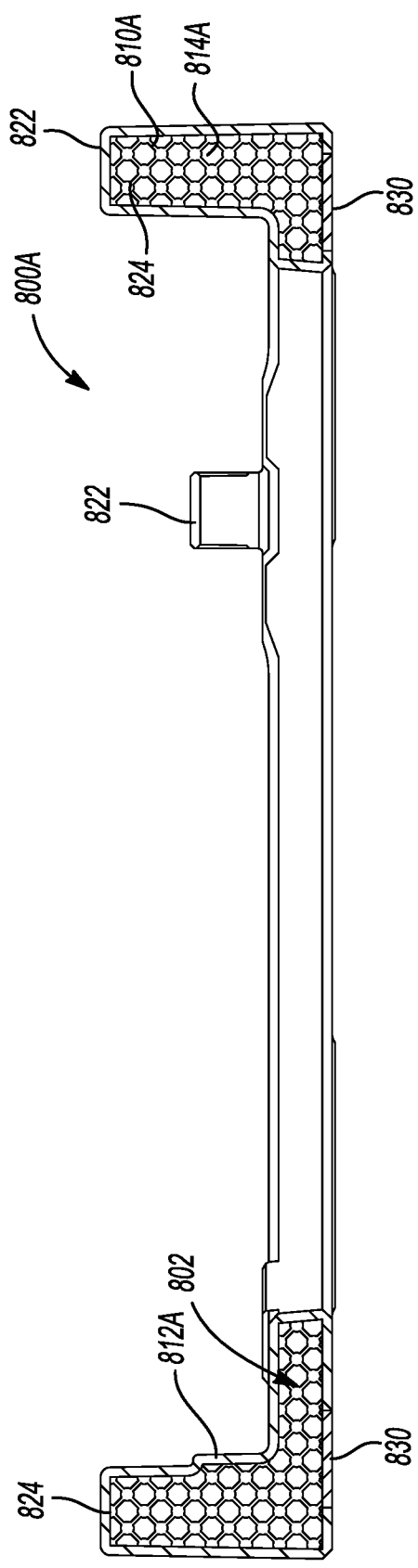

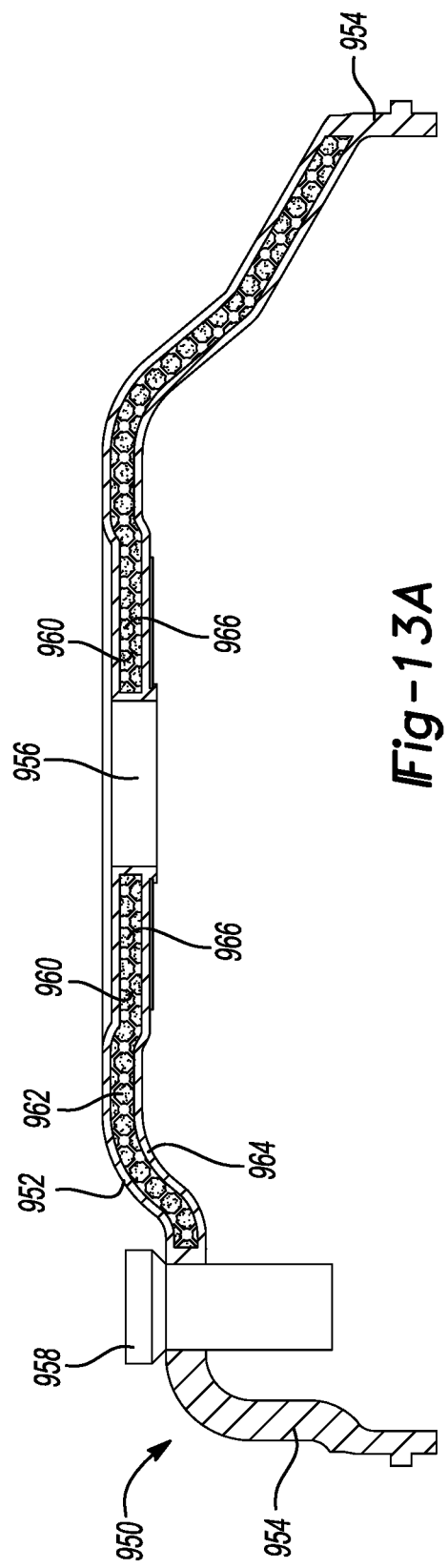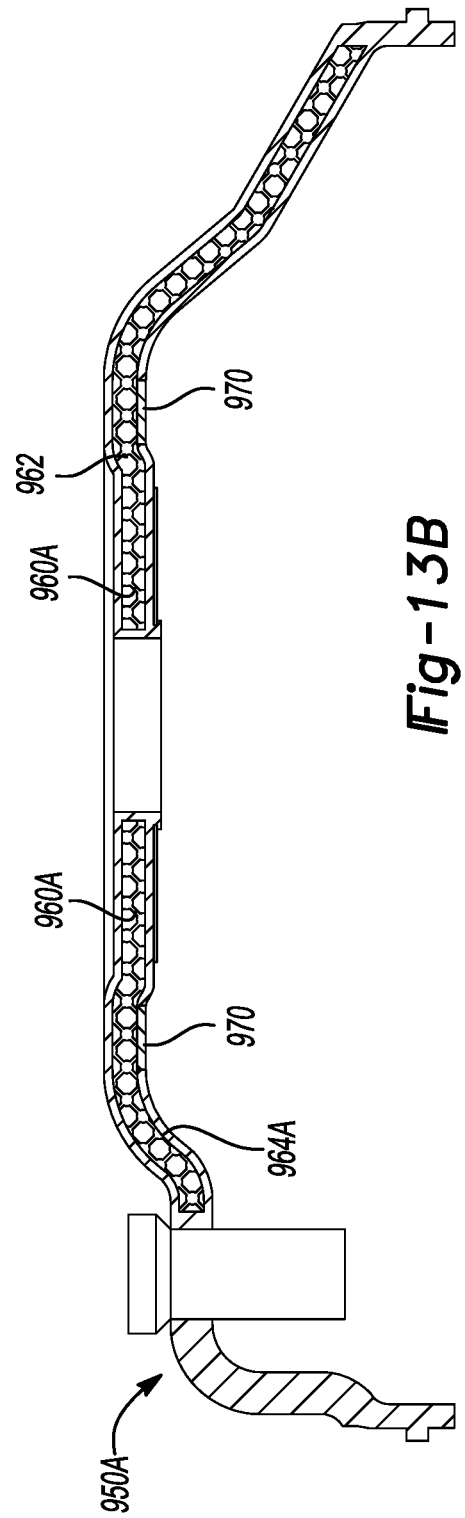

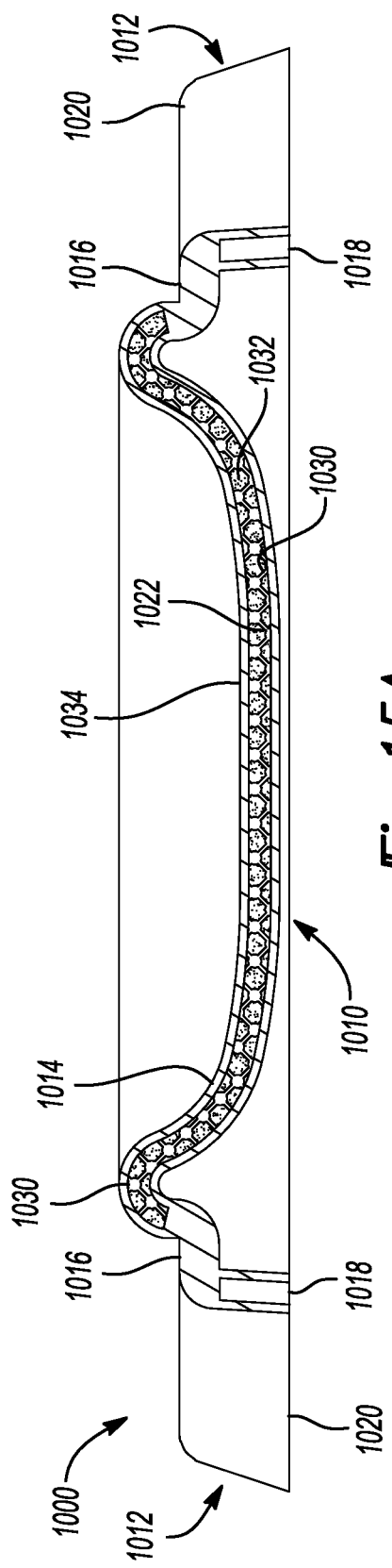
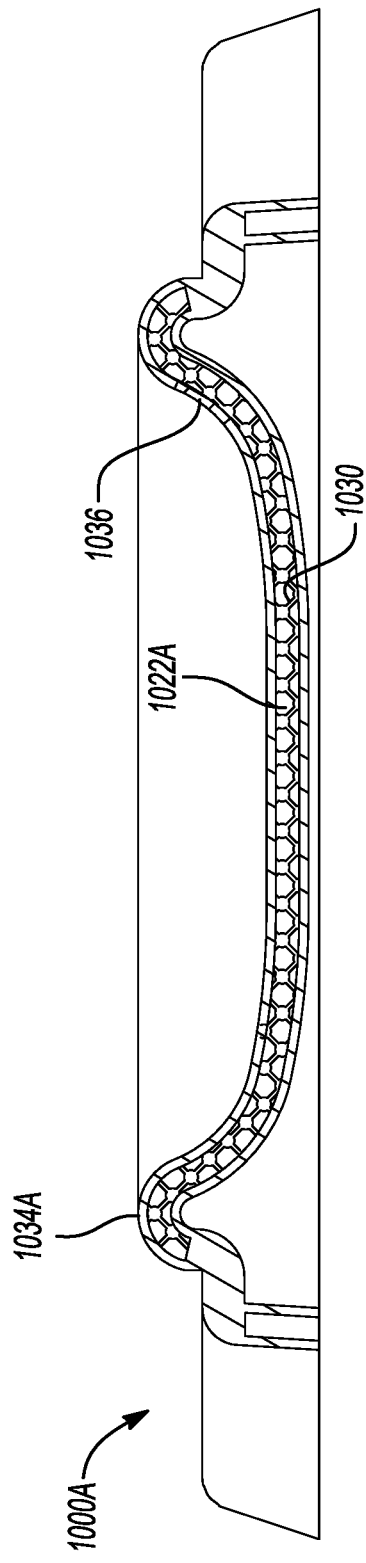
Fig-15A
Fig-15B

THERMAL AND SOUND OPTIMIZED LATTICE-CORED ADDITIVE MANUFACTURED COMPRESSOR COMPONENTS

CROSS-REFERENCE TO RELATED APPLICATIONS

This application claims the benefit of U.S. Provisional Application No. 62/387,118, filed on Dec. 23, 2015. The entire disclosure of the above application is incorporated herein by reference.

FIELD

The present disclosure relates to improved components for a compressors having thermal insulating or sound insulating properties provided by one or more lattice regions formed by additive manufacturing.

BACKGROUND

This section provides background information related to the present disclosure which is not necessarily prior art.

Compressors may be used in heating and cooling systems and/or other working fluid circulation systems to compress and circulate a working fluid (e.g., refrigerant) through a circuit having a heat exchanger and an expansion device. Efficient and reliable operations of the compressor are desirable to ensure that the system in which the compressor is installed is capable of effectively and efficiently providing a cooling and/or heating effect. When the compressive capacity of the compressor is reduced (e.g., due to a capacity modulation event), such that the relative orbital movement between the orbiting scroll member and the non-orbiting scroll member is varied, the compressor may produce undesirable vibrations, sounds and noises.

Further, loss of efficiency and capacity can occur when high levels of heat transfer occur between undesirable regions in a compressor. For example, certain compressors (e.g., scroll compressors) may be hermetically or semi-hermetically sealed with a high-side pressure design that includes both a high-side pressure region and a low-side pressure region inside the compressor housing. In hermetically or semi-hermetically sealed motor compressors, the refrigerant gas, which enters the housing as vapor at the inlet on a low-side, passes into and is processed within the compression mechanism, where it forms a compressed, pressurized refrigerant gas that passes through a high-side discharge. When compressing the refrigerant (e.g., gas), work is required, thus generating heat. The processed discharge gas thus has significantly higher temperatures and pressures than the pre-processed suction refrigerant. The heat may undesirably be transmitted from the high-pressure discharge gas to the low-pressure side, thus increasing suction gas temperatures and undesirably reducing the suction gas density. By heating the refrigerant gas on the low-pressure suction or inlet side, the refrigerant gas increases its volume, thus a mass flow rate of refrigerant gas entering the compression mechanism is lower than a mass flow rate of gas that would otherwise enter the compression mechanism if the refrigerant gas was at a lower temperature.

This refrigerant heating thus causes a smaller amount of inlet refrigerant gas to be introduced into the compression mechanism, causing a loss of efficiency of the refrigerant cycle. If heat transfer from a high-pressure discharge side to the low-pressure suction/inlet side is reduced, this can improve compressor performance and discharge line temperatures. In other applications where the compressor is used in a heating mode, it may be desirable to reduce heat transfer of the high-pressure refrigerant gas to the low-side suction gas or to the compressor ambient. Reducing the heat transfer from the discharge gas can increase discharge temperatures and therefore improve the heating capacity provided by the system. In other applications it may be advantageous to increase heat transfer. This would allow certain compressor components to operate at a lower temperature.

It would be desirable to have high-strength, light-weight compressor components that advantageously control heat transfer within a compressor or reduce sound generation and vibration during compressor operation to improve compressor performance and efficiency.

SUMMARY

This section provides a general summary of the disclosure and is not a comprehensive disclosure of its full scope or all of its features.

In certain variations, the present disclosure provides light-weight, high-strength insulating compressor components. The light-weight, high-strength insulating compressor component may include a body portion having at least one interior region comprising a lattice structure comprising a plurality of cells formed via additive manufacturing. The component also has a surface disposed over the lattice structure. The interior region comprising the lattice structure minimizes transmission of at least one of thermal energy or heat, sound, or vibrational energy.

In other variations, the present disclosure provides a thermally insulating compressor component. The thermally insulating compressor component may include a body portion. The body portion has at least one thermally insulating region formed therein having a lattice structure comprising a plurality of cells formed via additive manufacturing. A surface is disposed over the lattice structure, where at least one thermally insulating region has a thermal conductivity (K) of less than or equal to about 300 mW/m·K at standard temperature and pressure conditions.

In yet other variations, a sound insulating compressor component is provided by the present disclosure. The sound insulating compressor component has a body portion having at least one sound insulating region formed therein that is a lattice structure comprising a plurality of cells formed via additive manufacturing. The component also has a surface that is disposed over the lattice structure. In certain aspects, the sound insulating region reduces transmission of sound or vibrational energy by greater than or equal to about 30% as compared to transmission of the sound or vibrational energy through a comparative compressor component with the same design, but having a solid body portion.

In still other variations, the present disclosure provides methods for making light-weight, high-strength insulating compressor components. Such a method may include applying energy in a predetermined pattern to a powder precursor to create a fused solid structure via an additive manufacturing process. The fused solid structure is a compressor component having a lattice structure formed in an interior region. The lattice structure minimizes transmission of at least one of thermal energy, sound, or vibrational energy through the compressor component.

The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A-2K show a perspective view of representative distinct nodes for incorporation into lattice structures formed via additive manufacturing in accordance with certain principles of the present disclosure.

FIGS. 4A-4D illustrate varying density within unit cells of a lattice structure for incorporation into high-strength, light-weight insulating compressor components to form regions with greater levels of reinforcement and strength. FIG. 4A is a side view of the lattice structure, while FIGS. 4B-4D are sectional top and side views.

FIG. 7 is a sectional view of a lower bearing housing assembly formed of a solid structure made via conventional manufacturing techniques.

FIGS. 8A-8C show a high-strength, light-weight lower bearing housing assembly formed in accordance with certain aspects of the present disclosure that incorporate one or more internal lattice structures. FIG. 8A is a sectional view of the lower bearing housing, while FIGS. 8B and 8C are detailed sectional views of the lattice structures. In FIG. 8B, the lattice structure has a plurality of loose residual particles remaining in the void regions of the structure. In FIG. 8C, the residual powders are removed from the void regions in the lattice structure.

Figure 9A:
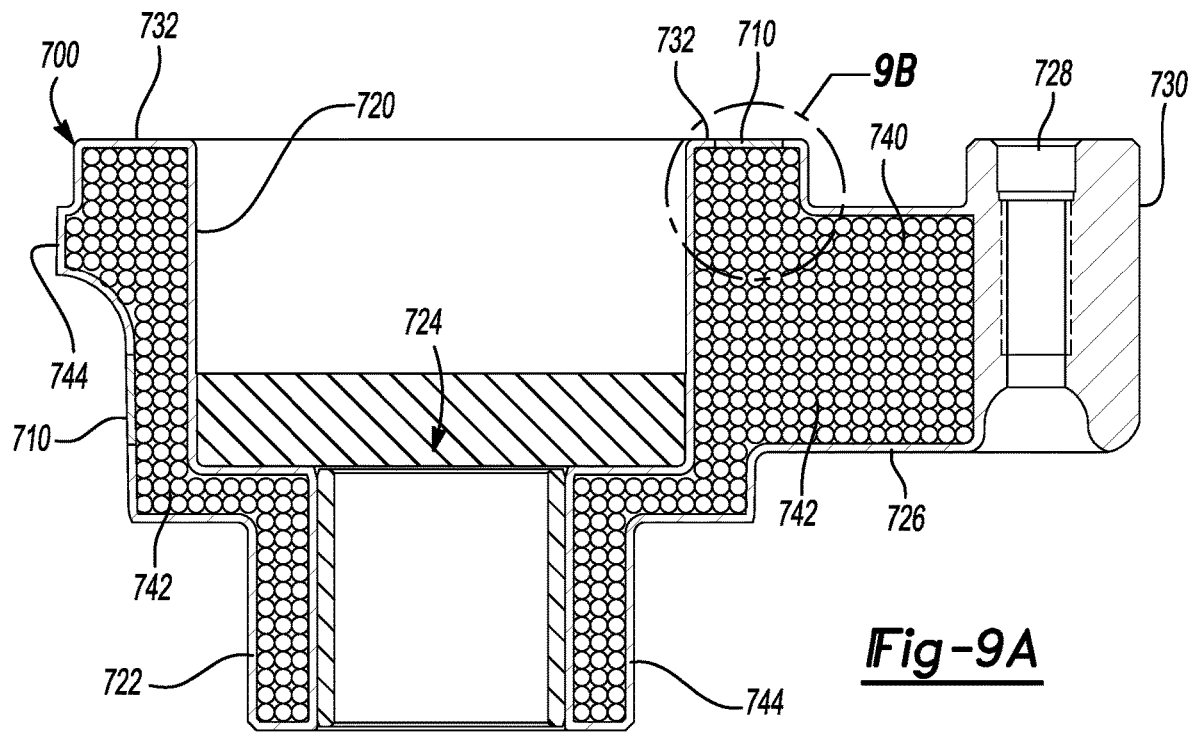

FIGS. 9A-9G show side views of a high-strength, light-weight main bearing housing having different exemplary insulating lattice structures for sound and vibration dampening in accordance with certain aspects of the present disclosure. FIG. 9A shows a side sectional view of the main bearing housing. FIGS. 9B-9G show detailed sectional views of different lattice structure configurations in accordance with the present disclosure for sound and vibration dampening.

FIGS. 10A-10B show side views of alternate variations of high-strength, light-weight Oldham coupling compressor components made in accordance with the present disclosure. In FIG. 10A, a plurality of loose residual particles remains in the void regions of a lattice structure after additive manufacturing. In FIG. 10B, removal holes are disposed in a surface of the Oldham coupling component, so that void regions in the lattice are empty after removal of loose residual particles through the removal holes after additive manufacturing.

Figure 11A:
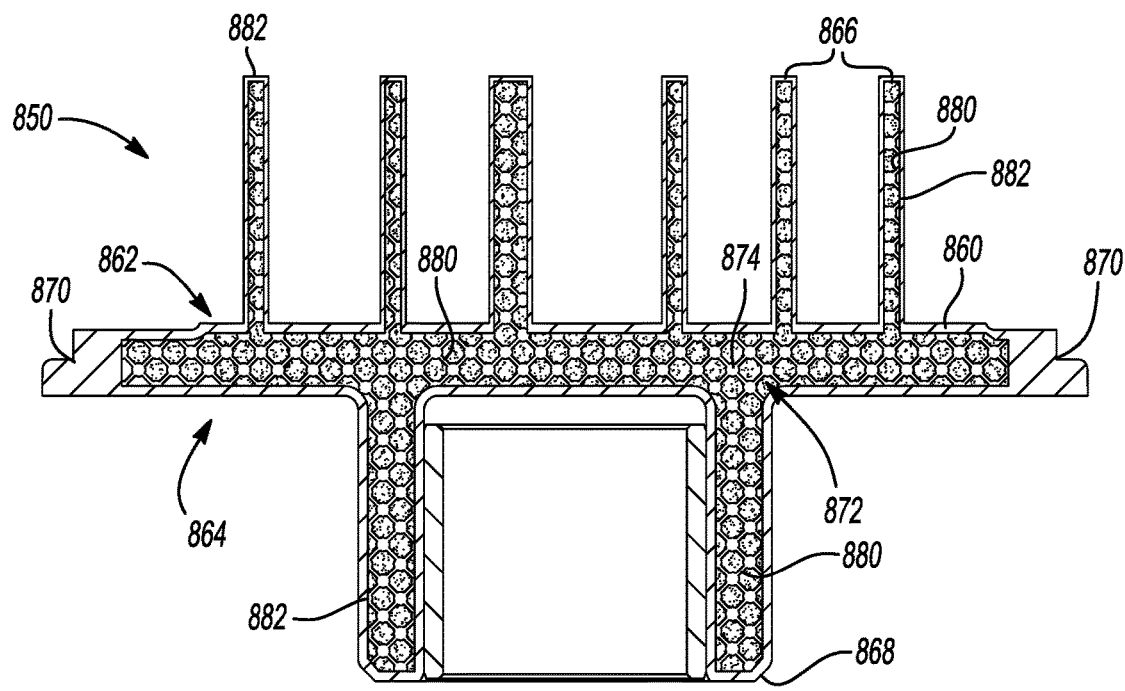
Figure 11B:
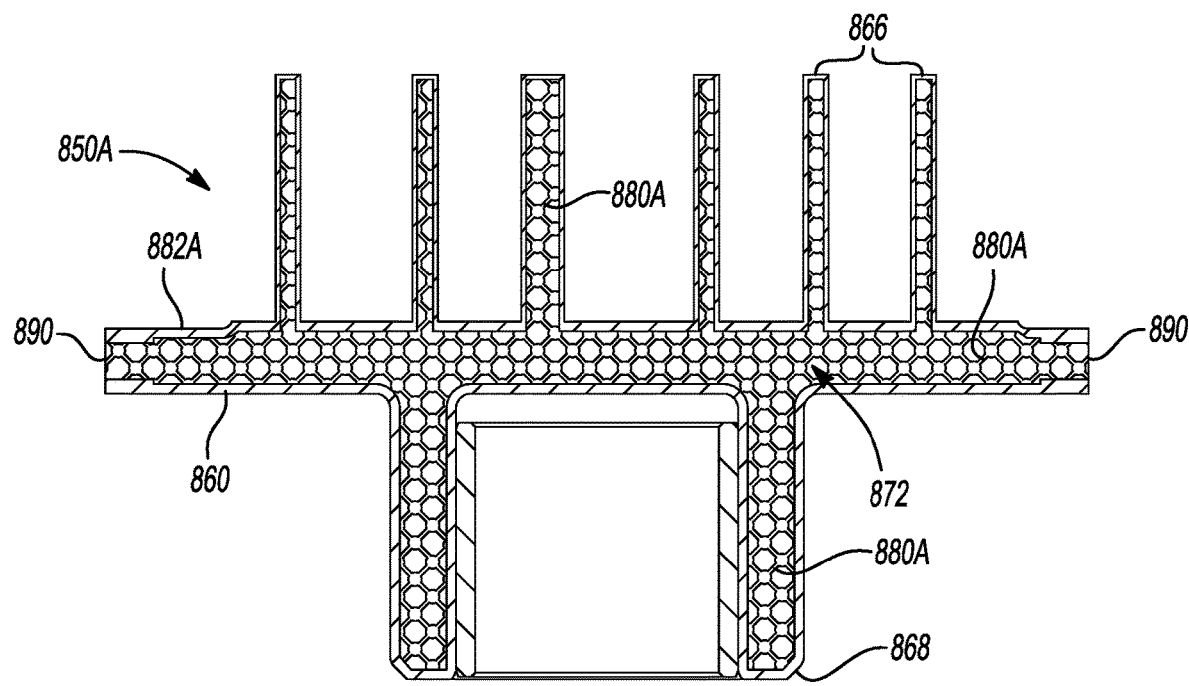

FIGS. 11A-11B show side views of alternate variations of high-strength, light-weight orbiting scroll compressor components made in accordance with the present disclosure. In FIG. 11A, a plurality of loose residual particles remains in the void regions of a lattice structure after additive manufacturing. In FIG. 11B, removal holes are disposed in a surface of the orbiting scroll component, so that void regions in the lattice are empty after removal of loose residual particles through the removal holes after additive manufacturing.

Figure 12A:
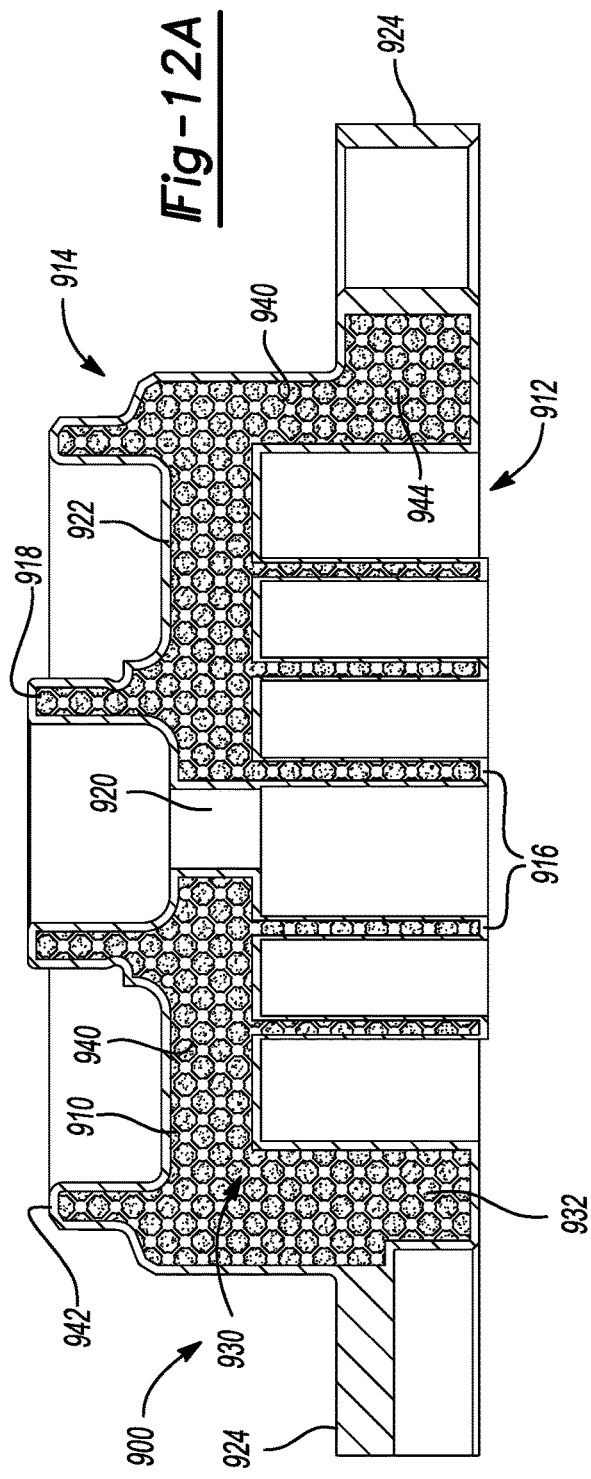
Figure 12B:
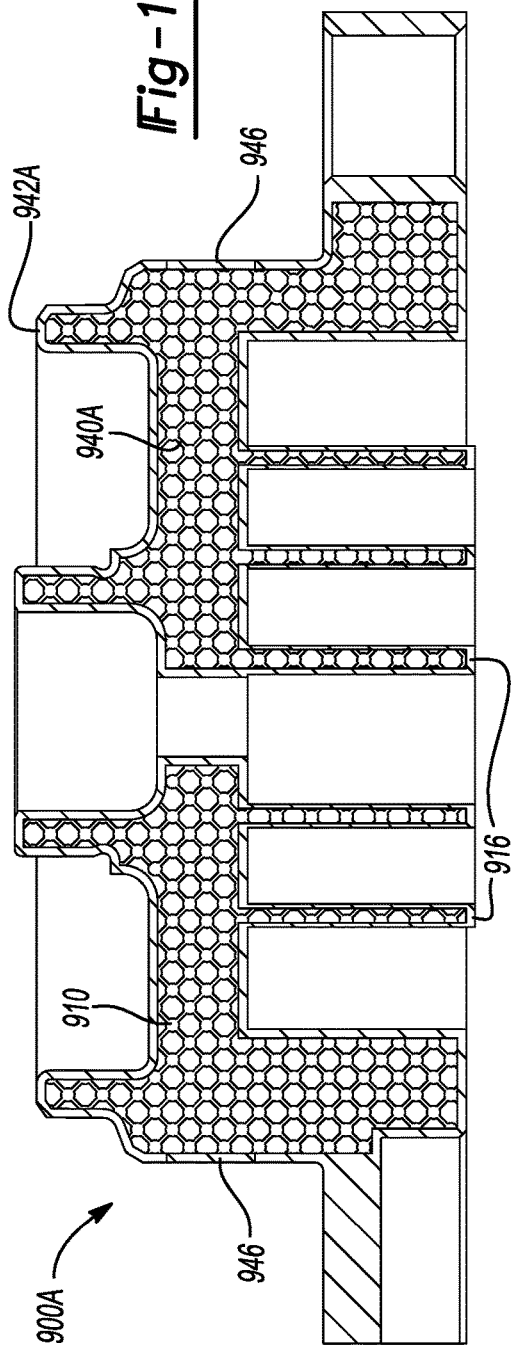

FIGS. 12A-12B show side views of alternate variations of high-strength, light-weight non-orbiting scroll compressor components made in accordance with the present disclosure. In FIG. 12A, a plurality of loose residual particles remains in the void regions of a lattice structure after additive manufacturing. In FIG. 12B, removal holes are disposed in a surface of the non-orbiting scroll component, so that void regions in the lattice are empty after removal of loose residual particles through the removal holes after additive manufacturing.

FIGS. 13A-13B show side views of alternate variations of high-strength, light-weight separator plate or muffler compressor components made in accordance with the present disclosure. In FIG. 13A, a plurality of loose residual particles remains in the void regions of a lattice structure after additive manufacturing. In FIG. 13B, removal holes are disposed in a surface of the muffler component, so that void regions in the lattice are empty after removal of loose residual particles through the removal holes after additive manufacturing.

Figure 14A:
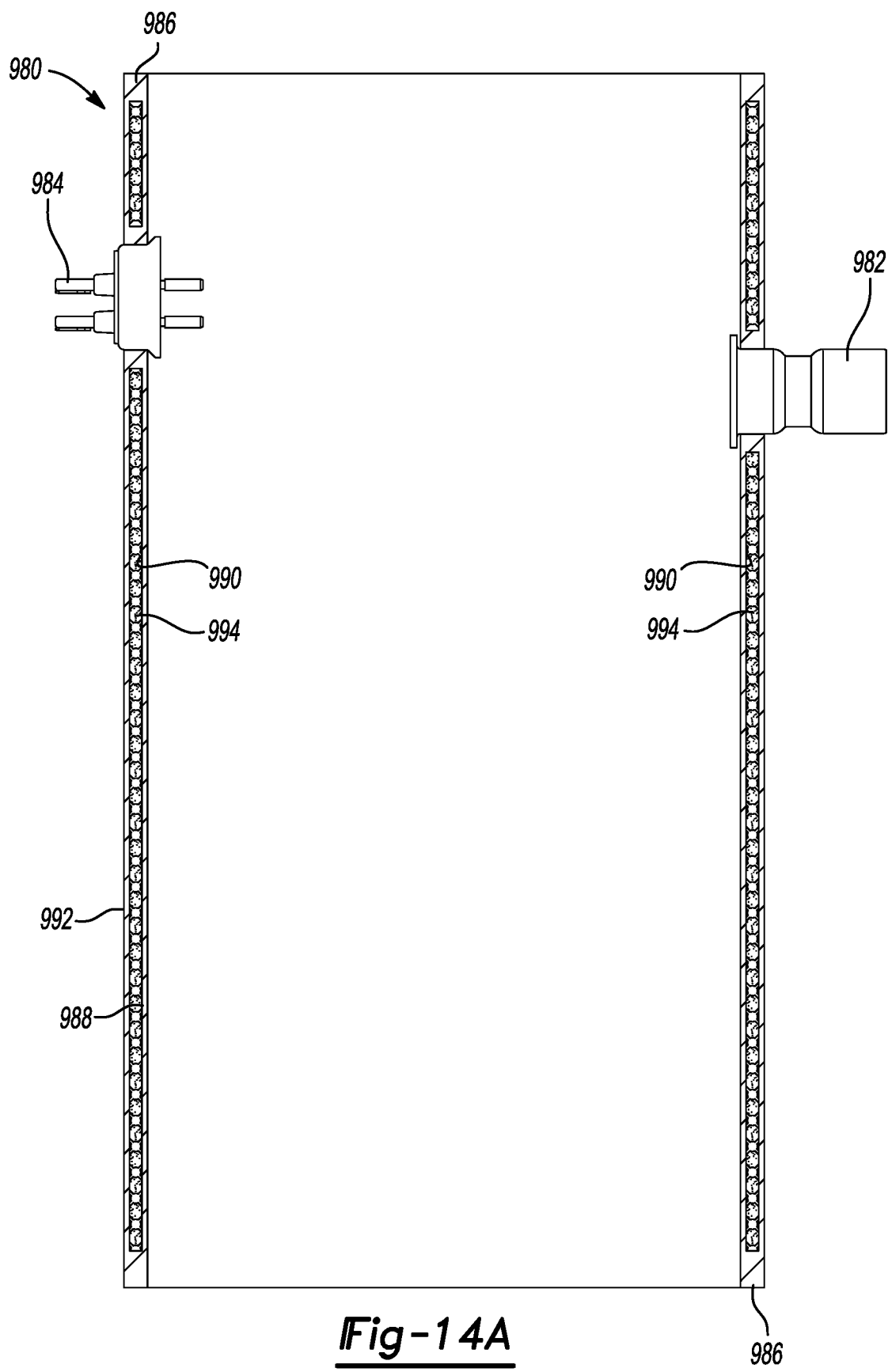
Figure 14B:
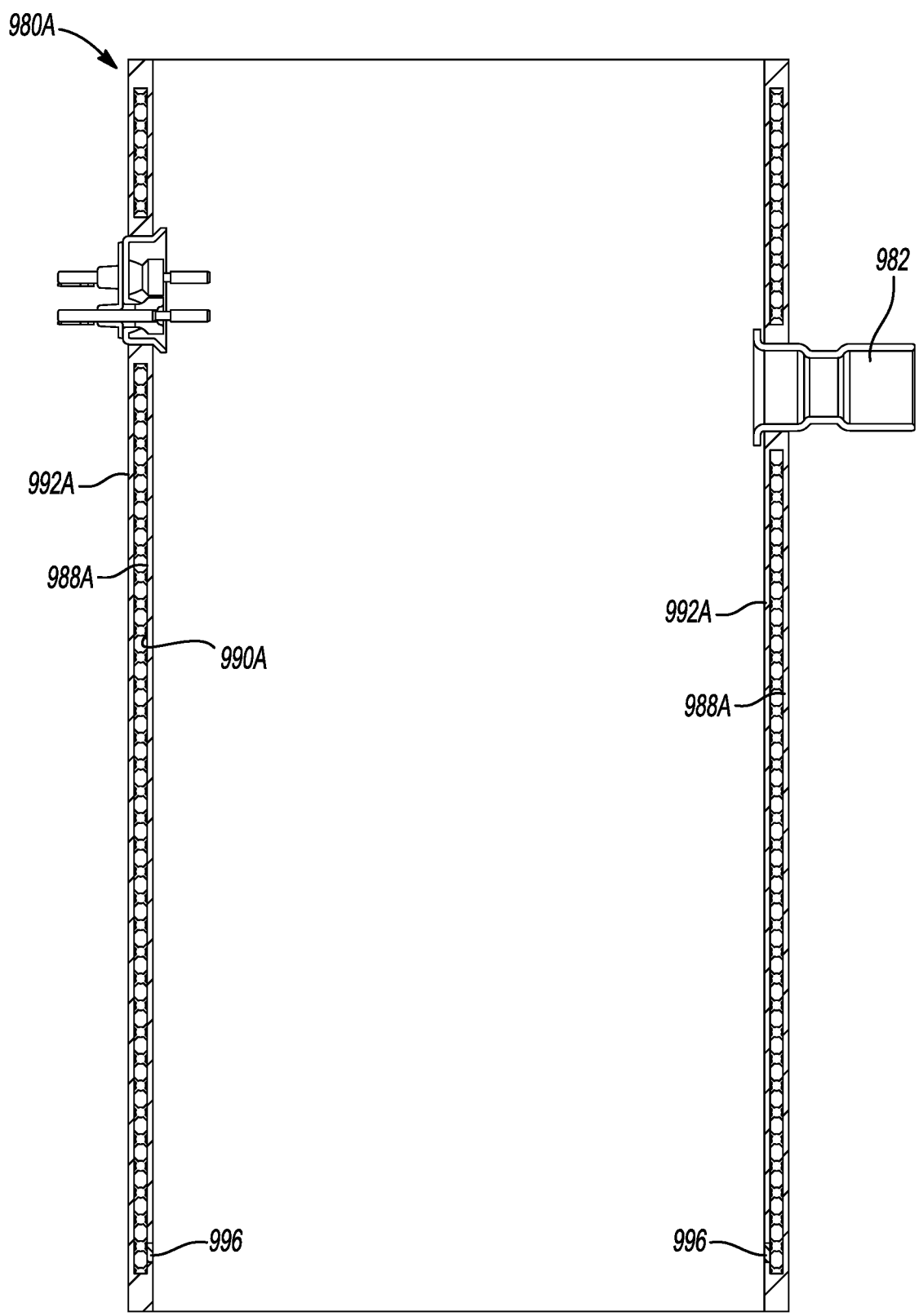

FIGS. 14A-14B show side views of alternate variations of high-strength, light-weight compressor housing or shell components made in accordance with the present disclosure. In FIG. 14A, a plurality of loose residual particles remains in the void regions of a lattice structure after additive manufacturing. In FIG. 14B, removal holes are disposed in a surface of the shell component, so that void regions in the lattice are empty after removal of loose residual particles through the removal holes after additive manufacturing.

FIGS. 15A-15B show side views of alternate variations of high-strength, light-weight compressor housing bottom or lower cover components made in accordance with the present disclosure. In FIG. 15A, a plurality of loose residual particles remains in the void regions of a lattice structure after additive manufacturing. In FIG. 15B, removal holes are disposed in a surface of the cover component, so that void regions in the lattice are empty after removal of loose residual particles through the removal holes after additive manufacturing.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges.

In various aspects, the present disclosure pertains to compressors that incorporate relatively high-strength, lightweight components that have the ability to: (i) reduce heat transfer through the component, (ii) reduce sound transmission through the component, or both (i) and (ii) to reduce both heat transfer and sound transmission through the compressor component. In this manner, the high-strength, lightweight compressor components of the present disclosure thus improve compressor efficiency. In other variations, the high-strength, light-weight compressor components have the ability to reduce transmission of sound and/or vibration, thus improving sound isolation to minimize vibration and sound transmission during compressor operation.

Figure 1:
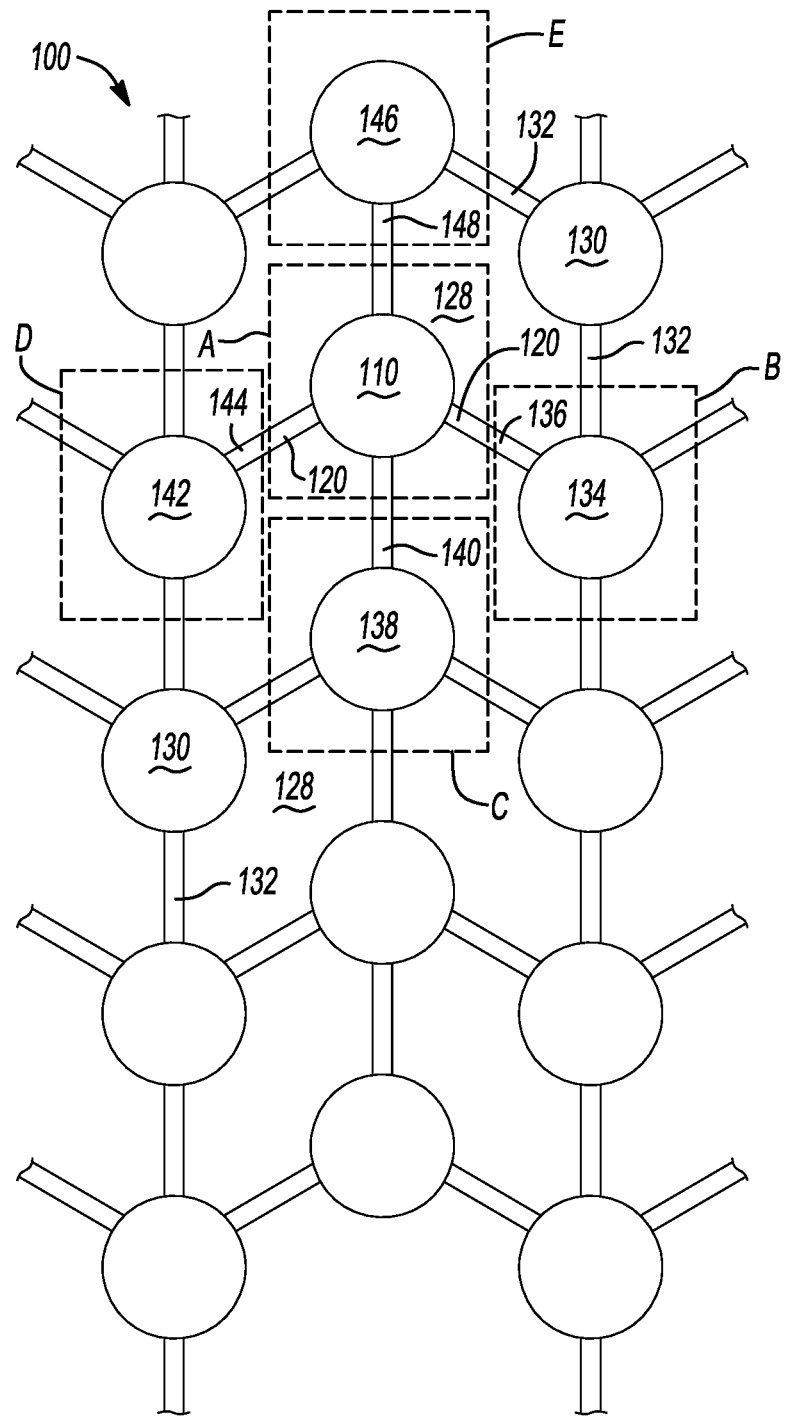
FIG. 1 shows a sectional view of an exemplary lattice structure formed via additive manufacturing in accordance with certain principles of the present disclosure.

In various aspects, the present disclosure provides a component for a compressor comprising at least one region defining a lattice structure or cellular material. In certain aspects, the region may be an internal or core region of a structural body portion of the component. An internal or core region is one that has a continuous surface formed over the lattice structure where the lattice structure would be exposed to an external environment. The component for the compressor may be an integrally formed, single piece or unitary structure, for example, a monolithic structure. Generally, a lattice structure includes a plurality of cell units that form a repeating structure. By way of non-limiting example, a two-dimensional lattice representative lattice structure 100 is shown in FIG. 1 that includes solid structures that define the lattice. The solid structures in the lattice structure 100 may include at least one node 110 and at least two connecting branches or bridge structures 120 attached to the node 110. Generally, a connecting bridge structure 120 extends between two nodes. Thus, a cell unit (marked by the outline "A") is formed that has the node 110 and the bridge structures 120. While not shown in the exemplary lattice structure 100 in FIG. 1, a unit cell may have a plurality of nodes, as well as a plurality of connecting branches or bridge structures. The cell units are regularly repeated within the lattice structure.

The lattice structure 100 may include a plurality of nodes 130 that may be interconnected with one another within a unit cell by one or more connecting branches/bridge structures 132. Such nodes 130 and connecting structures 132 are preferably formed of a solid material, such as a metal. The nodes 130 may be solid structures or may have hollow cores or interiors. In certain other variations, where the nodes or other structures within the lattice are hollow, they may be filled with a material, such as a powder. The material may also include engineered polymers, polymers including elastomers, polymeric composites having reinforcing materials and a matrix, and/or ceramics. In other variations, the hollow nodes or other structures may be filled yet other materials, such as gases or liquids, including refrigerants, oils, air, and the like, or there may be negative pressure or vacuum conditions in the hollow void regions.

The open lattice design of the lattice structure 100 is defined by the nodes 130 and connecting structures 132 and creates one or more open or void regions 128, where the solid structures are absent. Notably, the one or more void regions 128 may occupy a contiguous substantial volume of the unit cell and thus are distinguishable from a porous material having micropores or nanopores, but generally forming a solid porous structure. Notably, the solid structures in the lattice may be porous materials, but porous regions are distinguishable from the larger macroscale void regions. In certain aspects, the connecting structures may be relatively small or omitted altogether (e.g., where a plurality of nodes are in direct contact with one another, but still define regular repeating unit cells).

In certain aspects, respective cell units may be connected to one or more adjacent cell units to define an interconnected lattice structure. Thus, the connecting structures may extend from a first node within the unit cell to a second node in an adjacent unit cell. For example, in lattice structure 100 the node 110 in cell unit A may be connected to four distinct nodes 130 in adjacent unit cells. Thus, node 110 in cell unit A is connected to a first adjacent node 134 in adjacent cell unit B via a first bridge 136. Node 110 is connected to a second adjacent node 138 in adjacent cell unit C via a second bridge 140. Third adjacent node 142 in adjacent cell unit D is connected via a third bridge 144 to node 110. Lastly, a fourth adjacent node 146 in adjacent cell unit E is connected to node 110 by a fourth bridge 148. Notably, the exemplary lattice structure 100 is only shown in two dimensions; however, the nodes and connecting structures may also extend between unit cells and layers in three dimensions.

By way of non-limiting example, in certain variations, the unit cells may have a maximum dimension of greater than or equal to about 0.1 mm to less than or equal to about 10 mm and thus are referred to as "meso-structured" or non-foaming materials, having a scale generally between micro and macro scales. The number, position, size, and shape of the nodes and connecting structures in each unit cell of the lattice structure may vary, but preferably form a repeating structure that creates a cellular material.

Figure 2J:
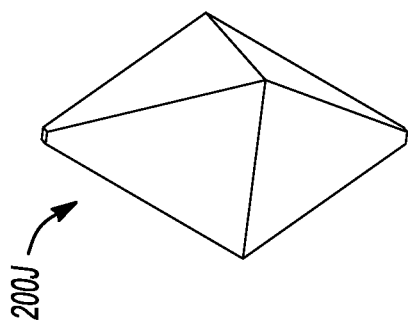
Figure 2K:
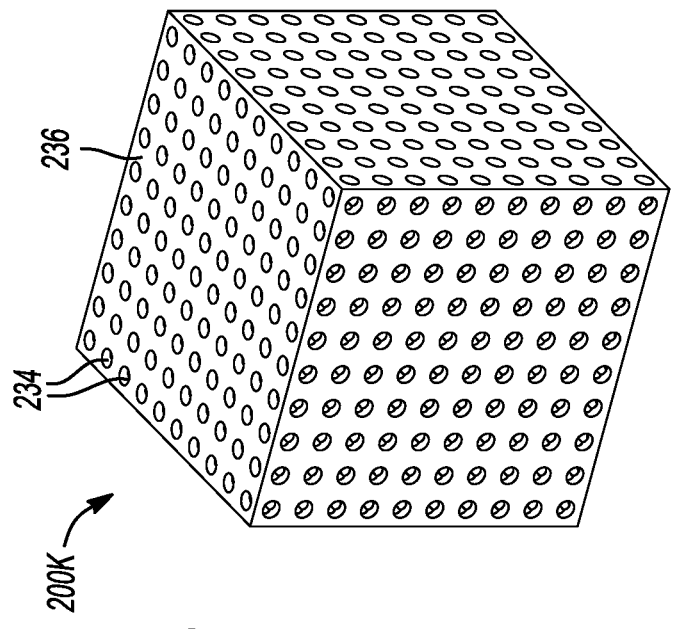
Figure 2I:
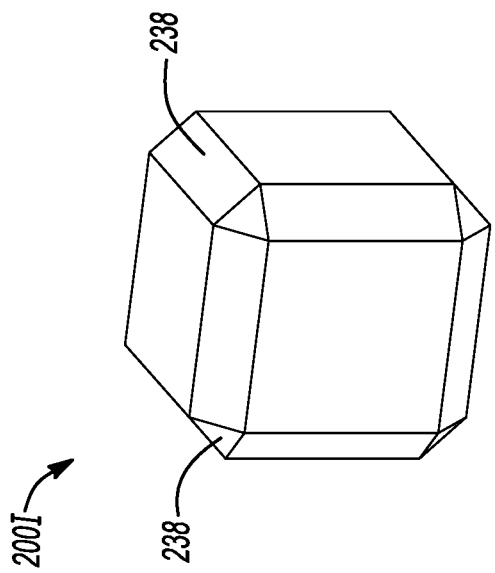

FIGS. 2A-2K show a plurality of distinct non-limiting node shapes. In FIG. 2A, a node 200A is a sphere. In FIG. 2B, a node 200B is a hollow sphere having a spherical shell 210 and a hollow interior 212. In FIG. 2C, a node 200C is a sphere with flat portions 214 disposed at regular intervals about a spherical surface 216. Notably, the number of flat portions 214 and spacing between them can vary from those shown. It should also be noted that this node can be hollow similar to node 200B. In FIG. 2D, a node 200D is a sphere that has a plurality of posts 218 disposed at regular intervals about a spherical surface 220. It should also be noted that this node can be hollow similar to node 200B. In FIG. 2E, a node 200E is a porous sphere having a plurality of small pores 222 (e.g., macropores or micropores) formed within a body 224 of the node 220E. In FIG. 2F, a node 200F has a double-cone shape. In FIG. 2G, a node 200G has a star sphere shape that includes a central sphere portion 226 with a plurality of radiating arms 228 extending from the central sphere portion 226. In FIG. 2H, a node 200H is a star having a plurality of radiating arms 230 connected to one another at a central region 232. In FIG. 2J, a node 200J has a double pyramid or double diamond shape. In FIG. 2K, a node 200K has a cube shape and is porous having a plurality of small pores 234 (e.g., macropores or micropores) formed within a body 236 of the node 200K. In FIG. 2I, a node 200I has a cube shape shown with beveled edges 238. It should be noted that a variety of other similar shapes may be used as a node, for example, a sphere is merely being representative of any round shape, including ovals or ellipsoids, and a cube may be any rectangular shape. Three dimensional polygonal or polyhedrons (e.g., hexagonal polygonal prism/honeycomb) and other more complex node shapes are likewise contemplated.

In certain variations, the light-weight high-strength insulating compressor has a lattice structure with a cell comprising a node having a shape selected from the group consisting of: a sphere, a hollow sphere, a modified sphere comprising one or more flat surface regions, a sphere comprising posts, a cone, a double-cone, a pyramid, a diamond, a star, a cube, a polyhedron, an irregular asymmetrical globular shape (e.g., an irregular non-linear/globular shape like an amoeba), and combinations thereof. In other variations, the node is selected from the group consisting of: a solid sphere, a porous sphere, a hollow sphere, a hollow sphere comprising a core filled with a plurality of particles, and combinations thereof. In other variations, the node may have an asymmetrical shape and is not required to have straight-lines or symmetry. For example, an irregular/globular (nonlinear)-shaped node with a curved outer perimeter (e.g., an amoeba shape) can be used as a repeating unit throughout the lattice.

As generally understood by those of skill in the art, the design of the lattice core structures (for example, node shape, bridge/arm design, length, and angles between the nodes and bridges) can be varied depending upon the application. Specifically, the directionality of the mechanical stress (or sound or thermal gradients) are important considerations. For example, one lattice structure optimal for reducing heat transfer in the plane of the component may require a different structure if the heat were primarily traveling in a direction normal to the component. This applies to stress or load, as well as sound. The sound signature (wavelength distribution and amplitude) of the sound will dictate the type of lattice structure that is optimal. At certain times, maximizing free volume with less attendant volume of latticework is required for sound dampening. More free space allows more fluid (or metal powder, a vacuum, or other filler materials) to be used. However, more free volume (less percentage of latticework) may reduce strength, so a certain minimal amount of lattice-work is required to maintain a minimal strength for the component. In this case, a balance between dampening properties and strength can be struck.

Strength (e.g., resistance to torsion, tension, bending, and the like) will generally be dependent upon the orientation of the lattice relative to the direction of stress. That is, in some cases it is desirable to orient the latticework so that during deflection, the lattice is stressed in compression, which will tend to maximize the strength of the component. In other cases the reverse may be the goal, whereby more deflection is desirable (and thus less component strength).

Figure 3C:
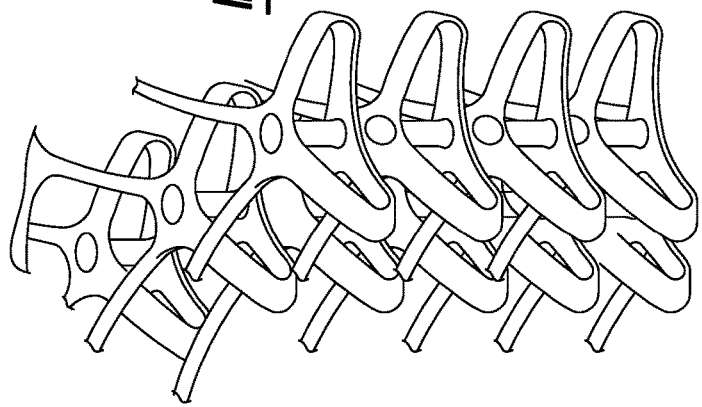
FIGS. 3A-3H show side views of exemplary distinct lattice structures for incorporation into high-strength, light-weight insulating compressor components in accordance with certain variations of the present disclosure.
Figure 3E:
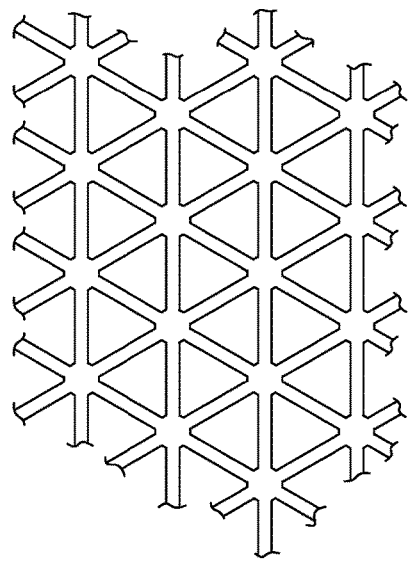
Figure 3B:
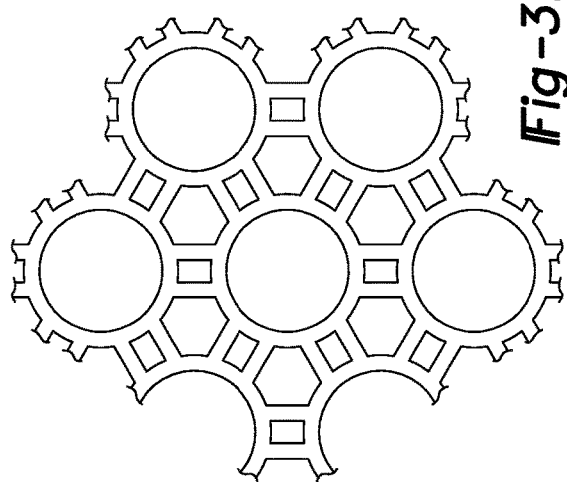
Figure 3D:
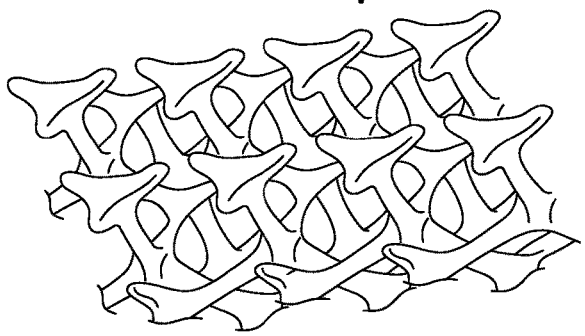
Figure 3A:
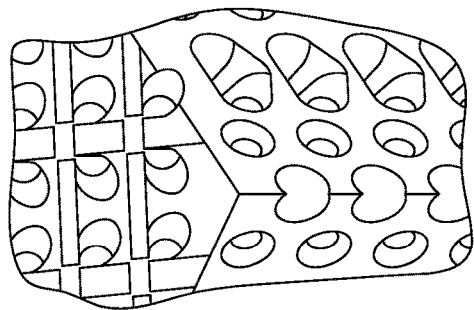
Figure 3F:
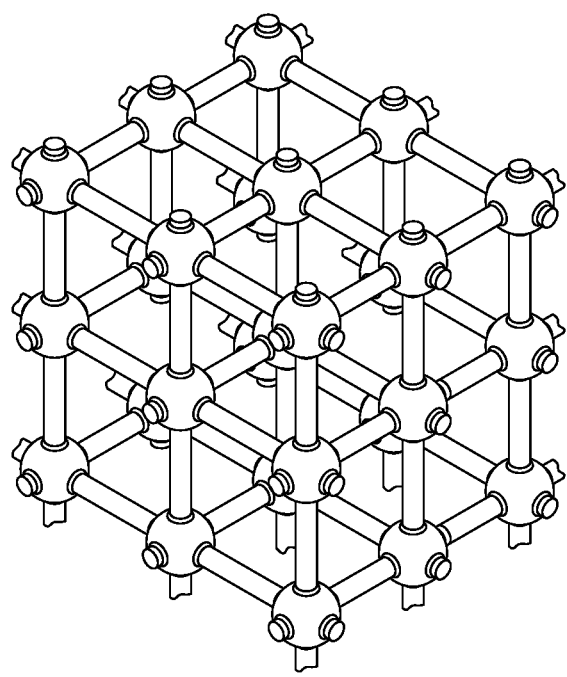
Figure 3G:
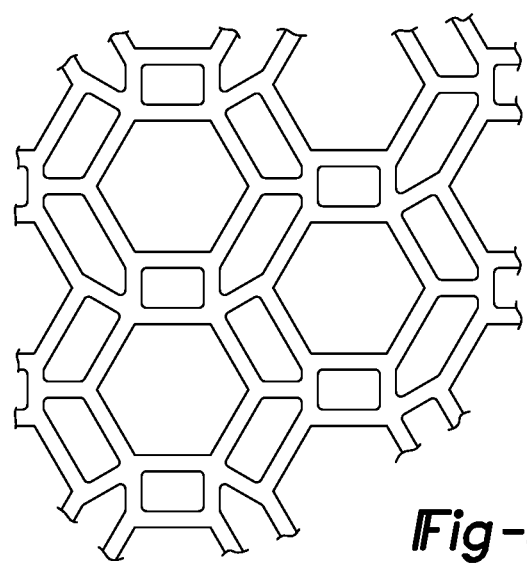
Figure 3H:
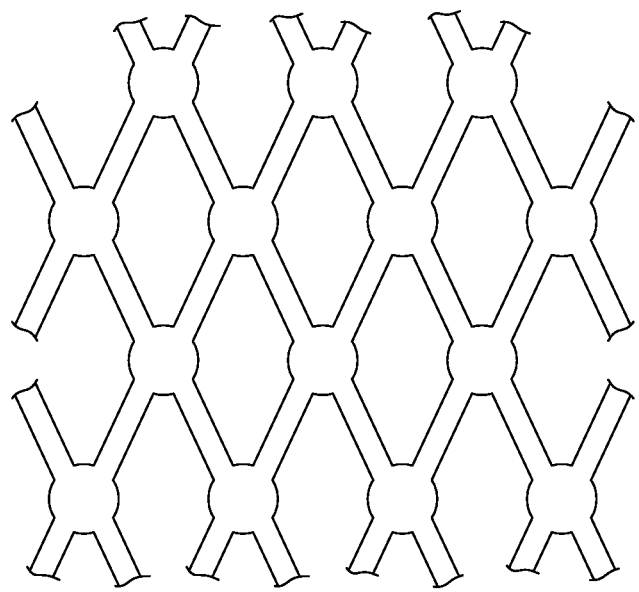

FIGS. 3A-3H show exemplary distinct lattice structures that may be employed in accordance with certain variations of the present disclosure. Notably, the respective lattice structures represent different nodes and different connecting structures within each respective unit cell that together define the lattice structure. For example, FIG. 3A represents a lattice structure that can provide high stiffness in all directions. FIGS. 3B and 3G are sphere-based lattices providing benefits associated with spherical structures. FIG. 3C is a lattice structure that can provide impact absorption, without losing lateral stability. FIGS. 3E and 3F are lattice structures that can be employed for multi-directional loading. FIGS. 3D and 3H are relatively simple lattice structures that can provide structural rigidity along with certain desired cushioning effects. These lattice structures can also provide thermal advantages. Further, while not shown, the lattice structure may be encased by a solid surface or continuous outer skin.

FIGS. 4A-4D illustrate that a density of the unit cells may be altered through the lattice structure to create regions with greater levels of reinforcement corresponding to higher density as compared to regions of lower density with somewhat less strength. In compressor components, the ability to control cell density and thus strength in certain regions is particularly advantageous, as certain select regions of the components may experience high levels of force and stress during operation of the compressor. Designed cellular materials provide an ability to only locate solid material where it is needed mechanically for a specific application.

In FIGS. 4A-4D, an exemplary lattice structure 240 is shown that has a plurality of nodes 250 formed of a sphere 252 with posts 254 (similar to the node shown in FIG. 2G). The lattice structure 240 includes a plurality of connecting bridges 256 extending between nodes 250. FIG. 4B is a top view of the structure in FIG. 4A in a direction of the arrow labeled "B," FIG. 4C is a view from behind the cube facing towards the front in a direction labeled "C," while FIG. 4D is a view from the side in a direction of the arrow labeled "D." As can be seen in a first region 260 of the lattice structure 240 the cells have a first density (having a first ratio of solid structure to void region within each unit cell). A second region 270 of the lattice structure 240 has a second density (having a second ratio of solid structure to void region within each unit cell). The first ratio is less than the second ratio, meaning the volume occupied by a solid structure in the second region 270 is greater than the volume occupied of the solid structure in the first region 260. In this manner, the second region 270 can be considered to have a higher density than the first region 260 within the lattice structure 240.

Figure 5:
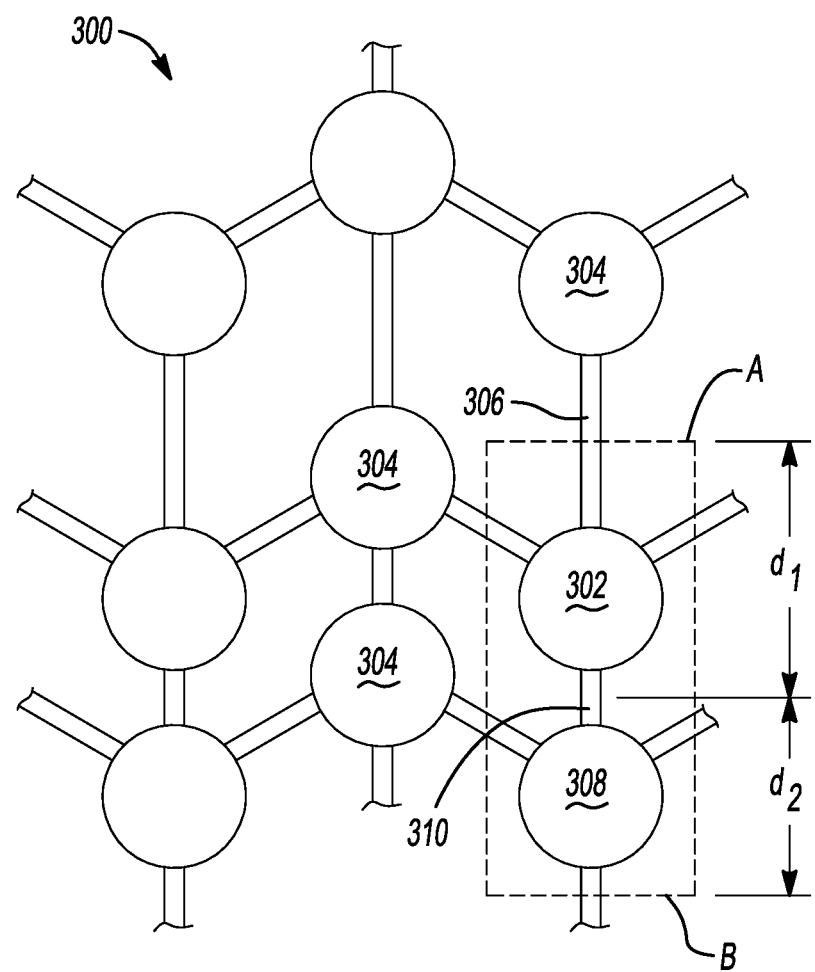
FIG. 5 shows a sectional view of another exemplary lattice structure formed via additive manufacturing in accordance with certain principles of the present disclosure, where the size of unit cells and thus cell density is varied within the lattice structure.

It should be noted that in other variations, depending upon the application, the size of unit cells may be selected to be smaller in a first region for a predetermined volume of the lattice structure as compared to a size of unit cells in other regions, so that the first region may be considered to have a higher density of cells for the predetermined volume. Such a concept is shown generally in FIG. 5, where a lattice structure 300 has a first cell unit A with a first node 302 connected to other distinct nodes 304 in other adjacent unit cells via connecting structures 306. The first unit cell A has a first dimension or length "$d_1$." A second unit cell B has a second node 308 connected to other distinct nodes 304 in adjacent cells via connecting structure 310. The second unit cell B has a second dimension of length "$d_2$." Connecting structures 306 are generally longer in the first unit cells A than the connecting structures 310 in the second unit cells B. Notably, the exemplary lattice structure 300 is only shown in two dimensions; however, the nodes and connecting structures may also extend between unit cells and layers in three dimensions. Thus, distances "$d_1$" and "$d_2$" of each cell can be varied within the lattice structure (in three dimensions) to create cells having different densities in different regions of the lattice structure. Thus, increasing the solid to void ratio within a cell is one variation of increasing density in the lattice structure, while reducing the size of the cell per unit volume and thus increasing the ratio of solid to void in a predetermined volume of the lattice is another variation of increasing cell density.

Certain non-limiting advantages of compressor components incorporating cellular or lattice regions is that they can be designed to have a high strength accompanied by a relatively low mass. Therefore, such a lattice structure region is light-weight and provides enhanced structural or compliance performance as compared to conventional bulk materials. Furthermore, when the compressor component is formed by additive manufacturing the component may be an integrally formed, single piece, unitary monolithic structure. Additive manufacturing also enables formation of highly complex near-net shapes. In fabricating the compressor components via additive manufacturing processes, one or more of the following additional advantages may be realized: the component, especially a component that is otherwise an assembly of parts, does not have mechanically fastened (e.g., bolted, screwed) or welded, bonded or otherwise fused at joints and seams; and the component itself may have a reduced cost of manufacturing, both from using potentially less expensive raw materials and also by reducing or eliminating various manufacturing and assembling steps, thus reducing attendant labor costs.

By "high-strength," in certain variations, it is meant that the component exhibits a tensile strength of greater than or equal to about 32,000 psi (about 220 MPa), optionally greater than or equal to about 65,000 psi (about 448 MPa), in certain aspects, optionally greater than or equal to about 125,000 psi (about 861 MPa), and in certain other aspects, optionally greater than or equal to about 250,000 psi (about 1,723 MPa).

These materials also can provide good energy absorption characteristics and good thermal and acoustic insulation properties, as well. In certain aspects, the compressor component has a body portion having at least one interior region comprising a lattice structure formed via additive manufacturing that minimizes transmission of at least one of thermal energy, sound, or vibration. In certain aspects, the lattice structure is thermally insulative. By "thermally insulative," in certain variations, it is meant that a component incorporating an insulating region(s) comprising a lattice structure exhibits a thermal conductivity (K) at standard temperature and pressure conditions (about 32° F. or 0° C. and an absolute pressure of about 1 atm or 100 KPa) of less than or equal to about 0.5 W/m·K, optionally less than or equal to about 0.3 W/m·K, optionally less than or equal to about 0.1 W/m·K, optionally less than or equal to about 200 mW/m·K, optionally less than or equal to about 150 mW/m·K, optionally less than or equal to about 100 mW/m·K, optionally less than or equal to about 75 mW/m·K, optionally less than or equal to about 60 mW/m·K, optionally less than or equal to about 50 mW/m·K, optionally less than or equal to about 40 mW/m·K, optionally less than or equal to about 30 mW/m·K, optionally less than or equal to about 20 mW/m·K, optionally less than or equal to about 10 mW/m·K, optionally less than or equal to about 5 mW/m·K, and in certain aspects, optionally less than or equal to about 1 mW/m·K. In certain variations, the thermal conductivity is greater than or equal to about 0.3 mW/m·K to less than or equal to about 0.5 W/m·K. In certain variations (where a vacuum, gas or oil is present in the lattice structure), the thermal conductivity is optionally greater than or equal to about 0.001 mW/m·K to less than or equal to about 0.1 W/m·K.

In certain aspects, the compressor component according to the present disclosure may be formed from a material having a first acoustic impedance value that differs from a second acoustic impedance value. Specific acoustic impedance (Z) for a given material is defined as:

$$Z = \rho V \quad \text{(Equation 1)}$$

where $\rho$ is the material's density and V is the acoustic velocity of the material. Acoustic impedance can also be understood to be a ratio of a pressure over an imaginary surface in a sound wave to a rate of particle flow across the surface (e.g., a ratio of acoustic pressure (p) to acoustic volume flow (U)). Acoustic impedance can be used to determine acoustic transmission and reflection at a boundary between two distinct materials having different acoustic impedance values. Further, acoustic impedance relates to a material's ability to absorb sound. In various aspects, a difference in acoustic impedance is maximized, for example, between a first acoustic impedance of the lattice structure within the component and a second acoustic impedance of adjacent materials, including solid structures in other regions of the component or adjacent components in the compressor.

The insulating cellular or lattice regions serve to minimize transmission of at least one of thermal energy, sound, or vibration through the compressor component and thus within the compressor. In certain aspects, a body portion of the light-weight high-strength insulating compressor component having the lattice structure reduces transmission of at least one of thermal energy, sound, or vibrational energy by greater than or equal to about 30% as compared to transmission of the at least one of thermal energy, sound, or vibrational energy through a comparative solid body portion. In other aspects, the body portion having the lattice structure reduces transmission of at least one of thermal energy, sound, or vibrational energy by greater than or equal to about 40% as compared to transmission of the at least one of thermal energy, sound, or vibrational energy through a comparative solid body portion, optionally greater than or equal to about 40%, optionally greater than or equal to about 50%, optionally greater than or equal to about 60%, optionally greater than or equal to about 70%, optionally greater than or equal to about 80%, optionally greater than or equal to about 90%, and in certain variations, optionally greater than or equal to about 100%.

In certain variations, the component comprising one or more interior regions having a lattice structure optionally has a minimized transmission of thermal energy or heat. Such a reduced thermal transmission or conduction (e.g., an average thermal conductivity (K) in mW/m·K at standard temperature and pressure conditions) through the component may be less than or equal to about 20% as compared to a comparative thermal transmission or conduction through the same component formed of a solid structure by a conventional manufacturing technique (e.g., casting, forging, powder metal sintering), optionally less than or equal to about 30%, optionally less than or equal to about 40%, optionally less than or equal to about 50%, optionally less than or equal to about 60%, optionally less than or equal to about 70%, optionally less than or equal to about 80%, optionally less than or equal to about 90%, and in certain variations, optionally less than or equal to about 100%.

In other variations, the component comprising one or more interior regions having a lattice structure optionally has a reduced rate of acoustic or sound transmission or conduction through the component of less than or equal to about 20% as compared to sound transmission through the same component formed of a solid structure by a conventional manufacturing technique (e.g., casting, forging, powder metal sintering), optionally less than or equal to about 30%, optionally less than or equal to about 40%, optionally less than or equal to about 50%, optionally less than or equal to about 60%, optionally less than or equal to about 70%, optionally less than or equal to about 80%, optionally less than or equal to about 90%, and in certain variations, optionally less than or equal to about 100%.

In other variations, the component comprising one or more interior regions having a lattice structure optionally has a reduced rate of shaking or vibration transmission or conduction through the component of less than or equal to about 20% as compared to vibration of the same component formed of a solid structure by a conventional manufacturing technique (e.g., casting, forging, powder metal sintering), optionally less than or equal to about 30%, optionally less than or equal to about 40%, optionally less than or equal to about 50%, optionally less than or equal to about 60%, optionally less than or equal to about 70%, optionally less than or equal to about 80%, optionally less than or equal to about 90%, and in certain variations, optionally less than or equal to about 100%.

Compressor components having such lattice structures can be formed by additive manufacturing techniques. Compressor components having lattice structure regions formed by additive manufacturing can have highly complex and freeform shapes. Certain advantages of additive manufacturing as compared to traditional formation processes, such as machining or metal molding, is that the shapes and passages formed can be conformal and quite complex (e.g., curved, tortuous). A digital three-dimensional modeling system can be used to first form a digital model of the compressor component structure, including the desired lattice design in the one or more preselected regions. The physical structure can then be formed from the digital model by direct or additive manufacturing. Direct manufacturing generally refers to direct formation of a scale model of a part or assembly using three-dimensional computer data.

Thus, direct or additive manufacturing techniques may be used to form complex metallic (or polymeric) structures having one or more regions with a lattice structure. Additive manufacturing techniques include direct-metal additive manufacturing processes, like powder bed fusion methods that fabricate complex metallic cellular structures by using a laser or electron beam directed over a bed of metal powder. The laser or electron beam is guided by information provided by the three-dimensional digital model to selectively sinter the metal and create the three-dimensional solid structures. Powder bed fusion processes include laser sintering, laser melting, direct metal laser sintering (DMLS), selective laser sintering (SLS), selective laser melting (SLM), selective heat sintering (SHS), electron beam melting (EBM), and LASERCUSING™ laser melting processes. Other direct manufacturing techniques that may be used for such processes include hybrid direct energy deposition (a combination of milling and laser metal deposition), binder jetting (where a liquid bonding agent is selectively deposited to join powder materials in a bed), stereolithography (SLA), laminated object manufacturing (LOM) or sheet lamination, directed energy deposition, ultrasonic additive manufacturing (UAM), fused deposition modeling (FDM), and solid ground curing (SGC), by way of non-limiting example.

In certain aspects, the present disclosure contemplates methods for making a light-weight, high-strength insulating compressor component. Such a method may include applying energy in a predetermined pattern to a powder precursor to create a fused solid structure via an additive manufacturing process. The powder precursor may be a plurality of metal particles in a bed. In certain variations, as discussed further below, the powder precursor comprises iron alloy particles or aluminum alloy particles. The predetermined pattern of application of energy may be repeated over certain areas and builds three-dimensional solid fused structures. The fused solid structure is a compressor component having a lattice structure formed in an interior region. The lattice structure minimizes transmission of at least one of thermal energy, sound, or vibrational energy through the compressor component. In certain aspects, the additive manufacturing process is selected from the group consisting of: direct-metal additive manufacturing, direct metal laser sintering (DMLS), selective laser sintering (SLS), selective laser melting (SLM), electron beam melting (EBM), stereolithography (SLA), laminated object manufacturing (LOM), fused deposition modeling (FDM), solid ground curing (SGC), and combinations thereof.

In various aspects, the one or more components fabricated by additive manufacturing processes are formed from and comprise a metal material. Suitable materials for additive manufacturing include those available as powder metals. The powder metal precursor may be pre-alloyed. Suitable metals comprise iron or aluminum, and may include iron alloys, like grey iron, stainless steel, copper alloys, tool steels, low alloy steels, titanium alloys, metal matrix composites, aluminum, or aluminum alloys, by way of non-limiting example. Such metals form structures having mechanical properties capable of withstanding stresses, torque, and high pressure conditions for long-term use in a compressor. Some suitable examples of powder metal materials are 17-4 (GPI), 17-4PH, 316L, 440C and 15-5 (PHI) stainless steels; M2, M50, H13, D2, PD1 tool steels; 4140, 4365, 8620 alloy steels; maraging steels, including MS1 maraging steel; NANOSTEEL™ composite alloys, nickel alloys, such as INCONEL™ 625 and 718 alloys and HX nickel alloy (HASTELLOY™ X); MP1 cobalt chrome, nickel copper alloys, metal matrix composites, titanium alloys, like Ti-6A1-4V, alloy 6 (STELLITE™ 6), C276 (HASTELLOY™ C), ANCORTI™ grade 5 and grade 23 as well as aluminum alloys such as AlSi10Mg (casting grade aluminum), some of which are produced by companies such as Sandvik Materials Technology, Hoeganaes Corporation, Kennametal Stellite, and NanoSteel Corporation.

Accordingly, the present disclosure contemplates a compressor component including at least one region defining a lattice structure or cellular material. In certain aspects, such a compressor component may be considered to have a lattice core. By using additive manufacturing processes, the production of compressor components having an internal lattice structure with a solid surface layer is provided. The internal lattice structure can be designed and optimized to provide rigidity and strength. The design of the lattice also allows for weight reduction in such a component as compared to components formed from conventional formation techniques, due to the void regions in the lattice. This combination therefore provides a strong and lightweight component. In addition to providing high strength and lower weight components, a lattice structure in one or more regions of the compressor component also affords improvements in acoustic insulation and/or thermal insulation for the compressor, resulting in more efficient and quieter operation.

In certain aspects, the present disclosure pertains to compressors that incorporate relatively high-strength, light-weight components that minimize or reduce transmission of sound to improve sound isolation to minimize vibration and sound transmission during compressor operation. Such compressor components can have enclosed lattice structures within one or more regions of a body of the part that have a fluid, such as gas or fluids (e.g., air), filling the void regions or a reduced pressure or vacuum within the one or more void regions to provide sound and vibration dampening. Thus, after powder removal, a liquid, a gas, a gel, or other substance can be introduced into the void regions of the lattice structure to further modify the final properties of the component. Such a technique may be especially useful for modifying and further improving sound reduction or thermal transfer properties by this approach (e.g., reduction in sound transmission). In certain variations, the liquid be a polymeric precursor that cures after filling the void regions to either become a hard solid or an elastic solid (rubber) or even a gel. In other variations, a solid filler material may be disposed in the void regions to provide sound or vibration dampening. The solid filler material may be powder metal, for example, the unsintered raw material that remains intact after the additive manufacturing process.

The compressor part having the lattice structure according to the present teachings may be any of a variety of parts in the compressor. By way of non-limiting example, the compressor may be multiple different kinds of compressors, including scroll, rotary vane element, centrifugal, single screw, twin screw, reciprocating, linear, and the like. In certain preferred aspects, the compressor components having lattice structures in accordance with the present disclosure are particularly suitable for use in conjunction with a scroll compressor.

Figure 6:
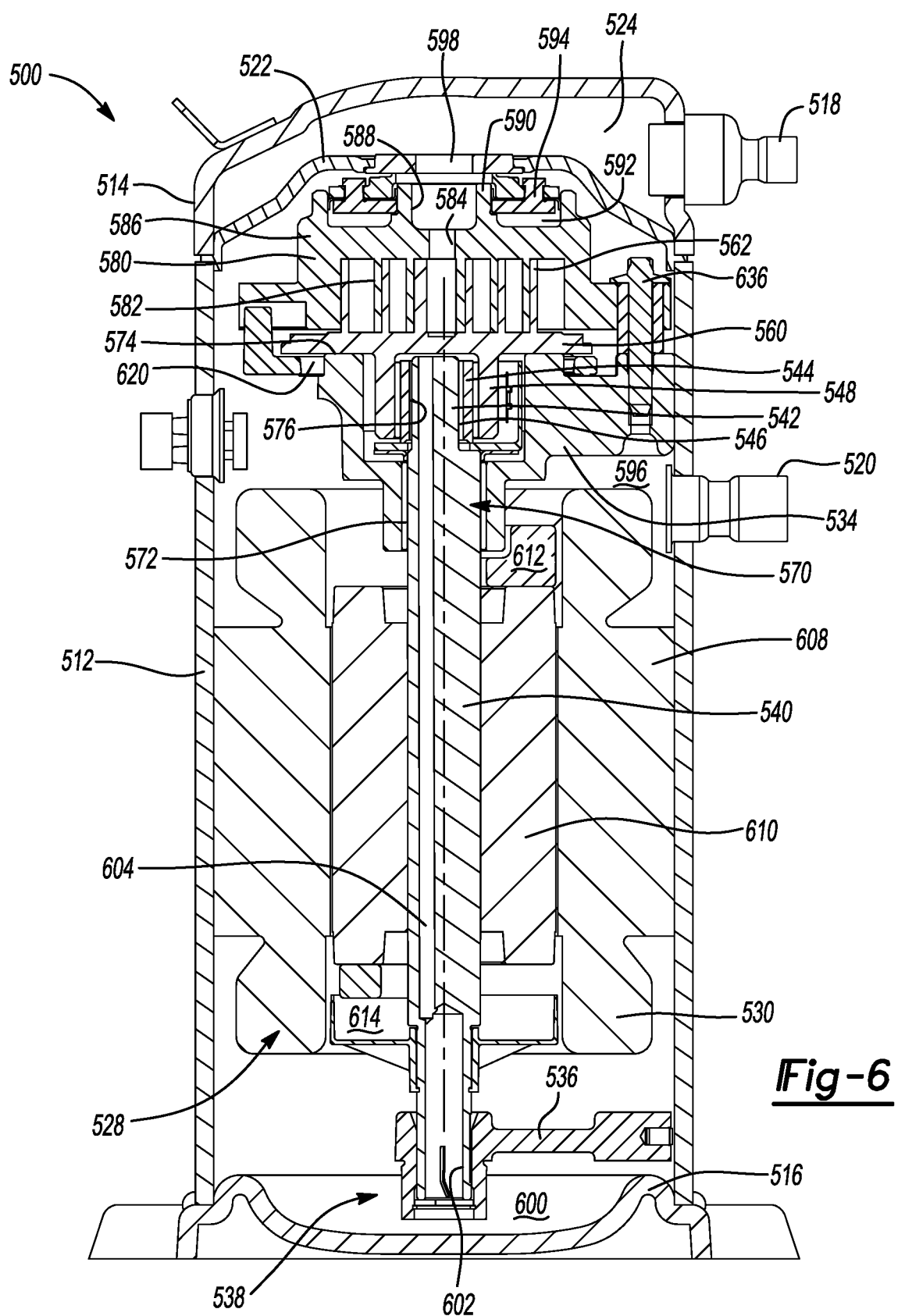
FIG. 6 is a sectional view through a center of a scroll compressor having a conventional design, show an exemplary conventional refrigerant scroll compressor 500

As further reference, the drawings and in particular FIG. 6, show an exemplary conventional refrigerant scroll compressor 500 that includes a generally cylindrical hermetic shell 512 having a cap 514 welded at the upper end thereof and a lower cover 516 welded to a lower end thereof. Cap 514 is provided with a refrigerant discharge 518, which may have the usual discharge valve therein. Other major elements affixed to the shell 512 include a compressor inlet 520; a transversely extending partition 522 which is welded about its periphery at the same point that cap 514 is welded to shell 512. A discharge chamber 524 is defined by cap 514 and partition 522.

A motor 528 including a motor stator 530 is disposed between the main bearing housing 534 and lower bearing support 536. A drive or crankshaft 540 has an eccentric crank pin 542 at the upper end thereof and is rotatably journaled in an upper bearing 544. The upper bearing 544 can include a conventional drive bushing 546 adjacent to (e.g., press-fitted therein). Thus, a cylindrical hub 548 of an orbiting scroll 560 receives the eccentric crank pin 542 and the upper bearing 544. The crankshaft 540 is also supported by and rotatably journaled in a lower bearing assembly 538 attached to the lower bearing support 536. In a central region of the scroll compressor 500, the crankshaft 540 passes through and rotates within an aperture 570 of main bearing housing 534, which may include a cylindrical main bearing member 572 disposed within aperture 570.

A main bearing housing 534 and lower bearing support 536 each define radially outwardly extending legs, which are each secured to the shell 512. The upper surface of the main bearing housing 534 is provided with a flat thrust bearing surface 574 on which is disposed the orbiting scroll 560 having a spiral wrap or vane 562 extending therefrom. Projecting downwardly from the lower surface of orbiting scroll 560 is the cylindrical hub 548. The upper bearing 544 is a self-lubricating sleeve type bearing that receives the drive bushing 546 therein. The cylindrical hub 548, upper bearing 544 and drive bushing 546 each define and create a concentric inner bore 576, in which crank pin 542 of crankshaft 540 is drivingly disposed. Notably, a portion of the bore 576 defines a drive flat surface (not shown) that can receive the crank pin 542, which itself has a flat surface that drivingly engages the drive flat surface formed in a portion of bore 576 to provide a radially compliant driving arrangement, such as shown in assignee's U.S. Pat. No. 4,877,382, the disclosure of which is hereby incorporated herein by reference.

Non-orbiting scroll 580 is provided having a spiral wrap or vane 582 positioned in meshing engagement with the orbiting spiral vane 562 of orbiting scroll 560. Non-orbiting scroll 580 has a centrally disposed discharge passage 584 defined by a base plate portion 586 communicating with an upward opening 588 which is in fluid communication with the muffler discharge chamber 524 defined by cap 514 and partition 522. Non-orbiting scroll 580 also includes an annular hub or raised shoulder portion 590 which surrounds the discharge passage 584. An annular recess 592 is also formed in non-orbiting scroll 580 within which is disposed a floating seal assembly 594.

An intake compartment 596 is in fluid communication with compressor inlet 520 through which the fluids (e.g., refrigerant) to be compressed within the intermeshed spiral vanes 562, 582 (for compression) are introduced. After the fluid passes through intake compartment 596, it is compressed in the spiral vanes 562, 582 so that the pressurized fluid is then released through the discharge passage 584. A reed valve assembly or other known valve assembly (not shown) may be provided in the discharge passage 584 to regulate flow from the discharge passage 584 through an opening 598 in muffler partition 522 and into discharge chamber 524.

The floating seal assembly 594 is supported by the annular recess 592 of non-orbiting scroll 580 and engages a seat of the partition 522 for sealingly dividing intake compartment 596 from discharge chamber 524. Recess 592 and floating seal assembly 594 cooperate to define an axial pressure biasing chamber which receives pressurized fluid being compressed by spiral vanes 562, 582 so as to exert an axial biasing force on non-orbiting scroll 580 to thereby urge the tips of respective spiral vanes 562, 582 into sealing engagement with the opposed baseplate surfaces.

The lower portion of the interior of shell 512 defines an oil sump 600 which is filled with lubricating oil. First bore 602 acts as a pump to force lubricating fluid up the crankshaft 540 and into second bore 604 and ultimately to all of the various portions of the compressor which require lubrication. Crankshaft 540 is rotatably driven by electric motor 528 including motor stator 530, windings 608 passing there through, and a motor rotor 610 press fitted on crankshaft 540 and having upper and lower counterweights 612 and 614, respectively.

An Oldham coupling 620 is disposed between orbiting scroll 560 and main bearing housing 534. The Oldham coupling 620 is keyed to orbiting scroll 560 and non-orbiting scroll 580 and thus prevents rotational movement of orbiting scroll 560. Oldham coupling 620 can be of the type of design disclosed in U.S. Pat. No. 5,320,506, the disclosure of which is hereby incorporated herein by reference As illustrated in FIG. 7, a conventional lower bearing housing assembly 538 includes a cylindrical opening 630 extending there through that allows a crankshaft 540 to be seated or mounted within a lower bearing support 632. A cylindrical lower bearing surface 634 is formed in lower bearing support 632 and is disposed directly against the crankshaft 540. In certain alternative variations, a separate self-lubricating cylindrical sleeve bearing may be seated or mounted in the lower bearing support 632. The lower bearing support 536 is attached to the lower bearing assembly 538 and includes a support arm 640 and a connecting portion 642 that can be attached to the shell 512 (as shown in FIG. 6). Crankshaft 540 has at the lower end the relatively large diameter concentric bore 602 which communicates with the radially outwardly smaller diameter bore 604 extending upwardly therefrom from the top of crankshaft 540.

In accordance with certain aspects of the present disclosure, a compressor component may be a lower bearing component 650, such as that shown in FIG. 8A. The lower bearing component 650 may have a body portion 652 with one or more interior regions 658 that have an internal lattice structure 660, such as those described above. The lattice structure 660 is formed internally and thus covered by a metal surface 662. Such a component may be formed by any of the additive manufacturing techniques described above. As shown, the lower bearing component 650 includes a cylindrical region 666 that has a cylindrical opening 667 extending there through that allows the crankshaft to be seated or mounted within the cylindrical region 666. The lower bearing support 664 defines a support arm 668 and a connecting portion 669. As shown, the internal lattice structure 660 is formed in the internal body portion of the cylindrical region 666 and internal region of the lower bearing support 664.

In this manner, the core regions having the internal lattice structure 660 formed from an additive manufacturing process may be light-weight, high-strength, and further sound or vibration insulating. In an embodiment like that shown in FIG. 8A, the internal lattice structures 660 provide insulating characteristics and thus are capable of minimizing transmission of sound and vibration through the lower bearing component 650. This allows the lower bearing housing to be stiff in areas for staking (e.g., to a housing or other stationary component) and flexible in the bearing areas to improve alignment robustness and bearing performance. Such principles are applicable to any of the compressor components discussed herein.

During the additive manufacturing process, residual powder may remain after energy is applied (e.g., laser that sinters or fuses the solid particles) to form the contiguous solid structures that create the part (including the lattice structure(s)). In certain variations, the residual powders, such as metal powders, may remain inside the lattice structure voids to provide additional insulating properties. The excess powder may be removed or in alternative variations, may remain in the voids of the lattice structure. FIG. 8B shows an exemplary embodiment where a simplified internal lattice structure 660A lattice structure 660A has a plurality of solid structures 672 formed by applying energy during the additive manufacturing process and void areas 674 defined therebetween. The solid structures 672 may include nodes 676 and connecting bridges 678. The void areas 674 may be filled with particles 680, for example, unsintered loose metal powders.

In other variations, the residual powders may be removed via one or more removal holes 670 shown in FIG. 8A. These removal holes 670 can be located anywhere on the component 650. Notably, in variations where the excess residual powder is not removed, such removal holes 670 may be omitted. Another exemplary lattice structure 660B is shown in FIG. 8C. The lattice structure 660B has a plurality of solid structures 672 formed by applying energy during the additive manufacturing process and void areas 674B defined therebetween. The solid structures 672 may include nodes 676 and connecting bridges 678. The void areas 674B are empty because residual particles are removed via the removal holes 670 in the component 650 shown in FIG. 8A. In certain variations, a further manufacturing step may close the removal holes, for example, where the voids (e.g., 674B) defined in the lattice structures (e.g., 660B) are to have a negative pressure or vacuum, or the materials forming the internal core regions are not compatible with materials in the compressor environment (e.g., not compatible with refrigerants and lubricant oils circulating within the compressor). The hole may or may not need to be sealed in the final part, but if so, methods such as soldering, welding, adhesives, and the like may be used. In certain aspects, the lower bearing compressor component may have one or more void regions of the lattice structure filled with an insulating material (or a negative pressure or vacuum) that provides further insulation that may further minimize transmission of at least one of thermal energy, sounds, or vibration. By using a lower bearing housing having such insulating lattice structures as described in FIGS. 8A-8C, in certain aspects, the component serves to reduce impact and vibration transmission to the compressor shell or housing.

In another variation in accordance with certain aspects of the present disclosure, a light-weight high-strength insulating compressor component may be a main bearing housing 700 like that in FIG. 9A. The main bearing housing component 700 defines a body portion 710 of the structure. The body portion 710 may include an upper cylindrical support region 720 and a lower cylindrical support region 722 that together define an opening 724. While not shown in FIG. 9A, the opening 724 may receive the cylindrical hub 548 of orbiting scroll 560 and the eccentric crank pin 542 of crankshaft 540 journaled in upper bearing 544 as shown in compressor 500 of FIG. 6). The main bearing component 700 also includes an outwardly extending leg 726 that includes a bore 728 that receives a fastener (not shown in FIG. 9A, but 636 in FIG. 6) on a terminal end 730 of the body portion 710. Terminal end 730 attaches the main bearing housing component 700 to the shell or housing. The main bearing housing component 700 also defines an upper thrust surface 732.

The body portion 710 of main bearing housing component 700 has one or more interior regions 740 that have an internal lattice structure 742, such as those described above. Various non-limiting embodiments of such lattice structures will be discussed further below. The lattice structure 742 is formed internally within the body portion 710 and thus covered by a metal surface 744. Such a component may be formed by any of the additive manufacturing techniques described above. The lattice structure 742 may have materials (e.g., loose particles) disposed within void regions or removed via removal holes in the main bearing housing component 700 (not shown). The core regions of the body portion 710 having the internal lattice structure 742 formed from an additive manufacturing process may be light-weight, high-strength, and further sound and/or vibration insulating. In an embodiment like that shown in FIG. 9A, the internal lattice structures 742 provide insulating characteristics to the main bearing housing component 700 and thus are capable of minimizing transmission of sound and vibration through the main bearing housing 700. Further, the main bearing housing prepared in accordance with the present disclosure has reduced mass as compared to a solid main bearing housing. Further, local lattice cell density modifications can be made in certain embodiments to increase or decrease the housing stiffness and improve sound and/or vibration insulating characteristics. This allows the main bearing housing to be stiff in areas for staking (e.g., to a housing or other stationary component) and flexible in the bearing areas to improve alignment robustness and bearing performance. Such principles are applicable to any of the compressor components discussed in the present disclosure.

Figure 9B:
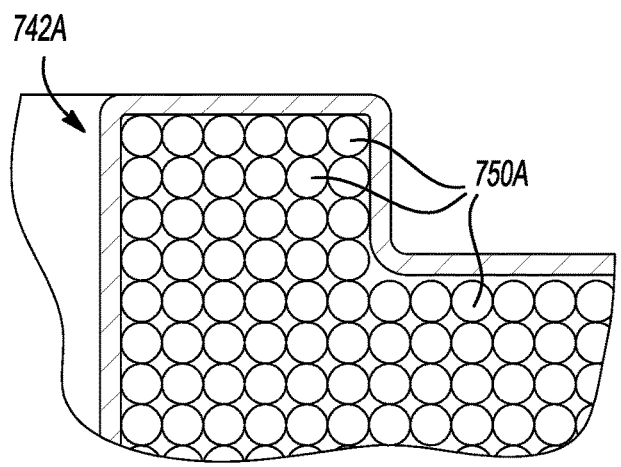

FIG. 9B shows one variation of an insulating lattice structure 742A that can be used in a compressor component, such as a main bearing housing 700. The insulating lattice structure 742A is particularly suitable for sound dampening and vibration insulation applications. Such designs and their underlying principles discussed herein may apply to other compressor components discussed herein. In FIG. 9B, a portion of the exemplary lattice structure 742A is shown. The lattice structure 742A includes a plurality of nodes 750A that are solid structures. The nodes 750A have a spherical or round shape, but any of the previous node shapes are also contemplated. As shown in this lattice structure 742A, the nodes 750A are in contact with one another or alternatively may have very short connecting structures between them.

Figure 9C:
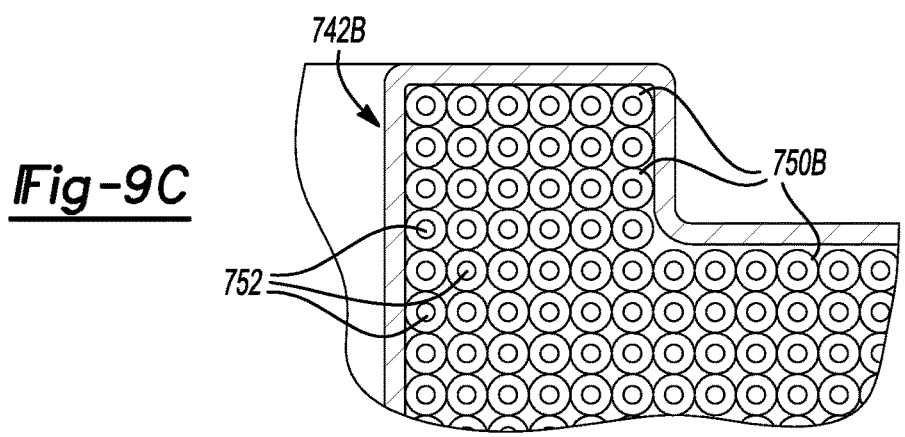

FIG. 9C shows another variation of an insulating lattice structure 742B that can be used in a compressor component, such as a main bearing housing 700. The insulating lattice structure 742B is particularly suitable for light-weight compressor components having sound dampening and vibration insulation properties. Such designs and their underlying principles discussed herein may apply to other compressor components discussed herein. In FIG. 9C, a portion of the exemplary lattice structure 742B is shown. The lattice structure 742B includes a plurality of nodes 750B that are solid structures. The nodes 750B have a spherical or round shape, but any of the previous node shapes are also contemplated. As shown in this lattice structure 742B, the nodes 750B have hollow centers or cores 752. As shown in this lattice structure 742B, the nodes 750B are in contact with one another or alternatively may have very short connecting structures between them.

FIG. 9D shows yet another possible variation of an insulating lattice structure 742C, having a plurality of nodes 750C that include a plurality of first nodes 760 and a plurality of second nodes 762 that are distinct from the first nodes 760. Both the first nodes 760 and the second nodes 762 are shown as spherical or round shapes, but any of the previous node shapes or designs are also contemplated. The first nodes 760 are solid filled node structures, while the second nodes 762 may be hollow node structures with a void region in a core 764. The cores 764 of the second nodes 762 may be hollow, but in certain variations, the cores 764 are filled with a material, such as loose powders (e.g., loose metal particles). The plurality of first nodes 760 defines a first row 770, while the plurality of second nodes 762 defines a second row 772. As shown in FIG. 9D, the first row 770 alternates with the second row 772 in a repeating fashion (here in a pattern of A, B, A, B, where A represent first row 770 and B represent second row 772). The first row 770 of the plurality of first nodes 760 defines a first major longitudinal direction or axis 774. The second row 772 likewise defines a second major longitudinal direction or axis 776. The first major longitudinal axis 774 is parallel to the second major longitudinal axis 776. Further, both the first and second major longitudinal axes 774, 776 are oriented to be orthogonal to a primary direction of sound wave(s) 778 propagation (or vibration) generated within the compressor. Such a lattice structure 742C configuration is particularly suitable for sound dampening and/or vibration dampening. Further, such an insulating lattice structure may be used in the body portions of a variety of distinct compressor components.

FIG. 9E shows yet another variation similar of an insulating lattice structure 742D. The insulating lattice structure 742D has a plurality of nodes 750D that include a plurality of first nodes 760D and a plurality of second nodes 762D that are distinct from the first nodes 760D. The first nodes 760D and the second nodes 762D are shown as spherical shapes and have the same design as in FIG. 9D, which for brevity will not be repeated herein. In FIG. 9E, the plurality of first nodes 760D defines a first row 770D, while the plurality of second nodes 762D defines a second row 772D. The first row 770D alternates with the second row 772D in a repeating fashion (here in a pattern of A, B, A, B, where A represent first row 770D and B represent second row 772D). The first row 770D of the plurality of first nodes 760D defines a first major longitudinal direction or axis 774D. The second row 772D likewise defines a second major longitudinal direction or axis 776D. The first major longitudinal axis 774D is parallel to the second major longitudinal axis 776D. Further, both the first and second major longitudinal axes 774D, 776D are oriented to be orthogonal to a primary direction of sound wave(s) 778D propagation (or vibration) generated within the compressor. However, in FIG. 9E, the direction of the sound wave(s) 778D propagation is orthogonal to that in FIG. 9D, so the orientation of the first and second major longitudinal axes 774D, 776D are orthogonal to the first and second major longitudinal axes 774, 776 in FIG. 9D. This lattice structure 742D configuration is also particularly suitable for sound dampening and/or vibration dampening when used within a component for a compressor. Further, such an insulating lattice structure may be used in the body portions of a variety of distinct compressor components.

Yet another variation of a compressor component in the form of a main bearing housing having a sound insulating lattice structure 742E is shown in FIG. 9F. The lattice structure 742E is similar to insulating lattice structures 742C and 742D in FIGS. 9D and 9E. The insulating lattice structure 742E has a plurality of nodes 750E that include a plurality of first nodes 760E and a plurality of second nodes 762E that are distinct from the first nodes 760E. The first nodes 760E and the second nodes 762E are shown as spherical shapes and have the same design as in FIG. 9D, which for brevity will not be repeated herein. In FIG. 9F, the plurality of first nodes 760E defines a first row 770E, while the plurality of second nodes 762E defines a second row 772E. Two first rows 770E are adjacent to two second rows 772E and alternate in a repeating fashion (here in a pattern of AA, BB, AA, where A represent first row 770E and B represent second row 772E, but other patterns are also contemplated). Like in previous variations, the first row 770E of the plurality of first nodes 760E defines a first major longitudinal direction or axis 774E. The second row 772E likewise defines a second major longitudinal direction or axis 776E. The first major longitudinal axis 774E is parallel to the second major longitudinal axis 776E. Further, both the first and second major longitudinal axes 774E, 776E are oriented to be orthogonal to a primary direction of sound wave(s) 778E propagation (or vibration) generated within the compressor. Such a lattice structure 742E configuration is also particularly suitable for sound dampening and/or vibration dampening when used within a component for a compressor. Further, such an insulating lattice structure may be used in the body portions of a variety of distinct compressor components.

FIG. 9G shows another variation of a compressor component in the form of a main bearing housing having a sound insulating lattice structure 742F with a design in accordance with certain aspects of the present disclosure. The lattice structure 742F is similar to insulating lattice structures 742C-742E in FIGS. 9D-9F, but has the plurality of nodes 750F disposed in an alternating pattern. The plurality of nodes 750F include a plurality of first nodes 760F and a plurality of second nodes 762F that are distinct from the first nodes 760F. The first nodes 760F and the second nodes 762F are shown as spherical shapes and have the same design as in FIG. 9D, which for brevity will not be repeated herein. In FIG. 9G, the first nodes 760F are regularly alternated with the second nodes 762F to form a checkerboard pattern, but other patterns are likewise contemplated. Thus, in a lattice row 780, a pattern of alternating first nodes 760F and second nodes 762F is formed. The lattice row 780 defines a third major longitudinal axis 782 that is oriented to be orthogonal to a primary direction of sound wave(s) 778F propagation (or vibration) generated within the compressor.

In the sound insulating lattice structure 742F of FIG. 9G, the plurality of first nodes 760F defines a first row 770F, while the plurality of second nodes 762F defines a second row 772F. Like in previous variations, the first row 770F of the plurality of first nodes 760F defines a first major longitudinal direction or axis 774F. The second row 772F likewise defines a second major longitudinal direction or axis 776F. The first major longitudinal axis 774F is parallel to the second major longitudinal axis 776F. The first and second major longitudinal axes 774F, 776F are parallel to one another and set on a diagonal orientation (e.g., offset at an angle, such as 45°) to the primary direction of sound wave(s) 778F propagation (or vibration) generated within the compressor. The first row 770F alternates with the second row 772F in a repeating fashion (here in a pattern of A, B, A, B, where A represent first row 770F and B represent second row 772F, but other patterns are likewise contemplated). By incorporating a main bearing housing having any of the insulating lattice structures described in FIGS. 9A-9G, in certain aspects, the component serves to reduce impact and vibration transmission to the compressor shell or housing.

As appreciated by those of skill in the art, the insulating lattice structure patterns and designs shown in the body portions of various figures, including in FIGS. 9D-9G, can be applied to any other lattice structure designs described or contemplated by this application and to any compressor components.

In other embodiments in accordance with certain aspects of the present disclosure, a high-strength, light-weight insulating compressor component may be an Oldham coupling 800, such as shown in FIG. 10A. As discussed above in the context of FIG. 6, the Oldham coupling 620 is keyed to orbiting scroll 560 and to non-orbiting scroll 580 to prevent rotational movement of orbiting scroll 560 as it is driven by crankshaft 540. In the embodiment shown in FIG. 10A, a body portion 802 of the Oldham coupling 800 has at least one core or interior region 804 comprising a lattice structure 810 formed via additive manufacturing. The Oldham coupling component 800 also has a solid surface 812 disposed over the lattice structure 810. As shown, there are no removal holes formed in the solid surface 812 for removal of residual or loose powder from the additive manufacturing process. Thus, a plurality of loose particles 814 may be left within the void regions of the lattice structure 810. This may provide additional sound or vibration dampening properties to the Oldham coupling 800. In various aspects, the Oldham coupling formed in accordance with the present disclosure is stronger and light weight, which helps to improve reducing sound and/or vibration.

The Oldham coupling 800 includes a ring 820 having a plurality of Oldham keys 822. A first pair of keys 824 is in a generally diametrically aligned relationship and each projects upward from a surface of Oldham coupling ring 820. A second pair of keys 826 (only one of the second pair is shown in FIG. 10A) is likewise aligned diametrically apart on the Oldham coupling ring 820 and also projects upward from surface. The first pair of keys 824 generally extends farther upwards to be capable of engaging with a non-orbiting scroll (not shown in FIG. 10A). The second pair of keys 826 is shorter and thus is capable of engaging with the orbiting scroll (again not shown in FIG. 10A). Oldham coupling 800 is guided in its translational movement by non-orbiting scroll keys 824 while being driven by orbiting scroll keys 826. As shown, the lattice structure 810 is disposed in interior regions 804 corresponding to the Oldham keys 822. The at least one interior region 804 comprising the lattice structure 810 minimizes transmission of at least one of thermal energy, sound, or vibration, preferably dampening sound or vibrations. Other interior regions of the Oldham coupling may also be formed of the lattice structure 810; however, may be left as a solid structure without a lattice to provide distinct mechanical properties in certain regions.

Another variation of such a high-strength light-weight insulating Oldham coupling component 800A is shown in FIG. 10B. The design and components in Oldham coupling 800A are the same as those in Oldham coupling 800 in FIG. 10A, unless otherwise discussed herein. In Oldham coupling component 800A, a solid surface 812A is disposed over the lattice structure 810A. However, one or more removal holes 830 are formed in the solid surface 812A for removal of residual or loose powder remaining after the additive manufacturing process. Thus, the lattice structure 810 may have empty void regions. Notably, some loose particles may remain in the voids after the removal process; however a majority of loose and residual particles are removed. In certain aspects, the lattice structure 810A design may provide adequate insulation to sound or vibration so that leaving such particles or introducing another material is not necessary. In other variations, the lattice structure 810A may have empty void regions that are subsequently filled with distinct insulating materials (e.g., solids, gels, foams, liquids, or gases) or negative pressure/vacuum. After removal, the removal holes 830 in the solid surface 812A may be subsequently sealed over with a material via a variety of known techniques to create such patches. The removal holes 830 may be sealed when it is desirable to have a contained or sealed interior volume, for example, when the interior region 804 is formed of or contains a material that is not compatible with refrigerant and oils in the compressor or a vacuum is present in the voids of the lattice structure 810A. The holes 830 may or may not need to be sealed in the final part, but if so, methods such as soldering, welding, adhesives, and the like may be used.

In other embodiments in accordance with certain aspects of the present disclosure, a high-strength, light-weight insulating compressor component may be an orbiting scroll component 850 as in FIG. 11A. The orbiting scroll 850 includes a baseplate 860 having a first side 862 and a second side 864. Vanes 866 define an involute scroll form that extends from the first side 862 of baseplate 860. A cylindrical hub 868 extends downwardly from the second side 864 of baseplate 860. A pair of outwardly projecting flange portions 870 each of which is provided with an outwardly opening slot (not shown, but which receive a pair of Oldham keys from the Oldham coupling). A body portion 872 of the orbiting scroll component 850 has at least one core or interior region 874 comprising a lattice structure 880 formed via additive manufacturing. A solid surface 882 is disposed over the lattice structure 880. The lattice structure 880 may be disposed in an interior region 872 of one or more of the baseplate 860, the cylindrical hub 868, and/or the vanes 866 of the involute scroll form. As shown in FIG. 11A, the lattice structure is formed as a continuous region within each of the baseplate 860, the cylindrical hub 868, and/or the vanes 866 of the involute scroll form. However, as with any of the other components described herein, discrete compartments or internal regions that are sealed or separated from one another may be formed with different lattice structures or different materials, depending upon mechanical properties required. By way of example, only one of the baseplate 860, cylindrical hub 868, or vanes 866 may include the lattice structure 880 (or some combination thereof), in alternative variations. Notably, there are no removal holes formed in the solid surface 882 for removal of residual or loose powder from the additive manufacturing process. Thus, a plurality of loose particles 884 may be left within the void regions of the lattice structure 880. This may provide additional sound or vibration dampening properties to the orbiting scroll component 850. Notably, certain areas may require thicker walls (or solid surfaces 882), for example, solid surface 882 may be thicker on the second side 864 along the cylindrical hub 868 and lower regions of the baseplate 860, while solid surface 882 may be thinner along the first side 862, including along the surface regions of vanes 866. The scroll vanes 866 are designed for weight reduction with equal or better strength than conventionally formed vanes. The thicker and thinner structures can be printed via the additive manufacturing in the areas where required.

Another variation of a high-strength light-weight insulating orbiting scroll component 850 is shown in FIG. 11B. The design and components in orbiting scroll component 850A are the same as those in orbiting scroll component 850 in FIG. 11A, unless otherwise discussed herein. In orbiting scroll component 850A, a solid surface 882A is disposed over a lattice structure 880A. However, one or more removal holes 890 are formed in the solid surface 882A for removal of residual or loose powder remaining after the additive manufacturing process. Thus, the lattice structure 880A may have empty void regions. Notably, some loose particles may remain in the voids after the removal process; however a majority of loose and residual particles are removed. In certain aspects, the lattice structure 880A design may provide adequate insulation to sound or vibration so that leaving such particles or introducing another material is not necessary. In other variations, the lattice structure 880A may have empty void regions that are subsequently filled with distinct insulating materials (e.g., solids, gels, foams, liquids, or gases) or negative pressure/vacuum. After removal, the removal holes 890 in the solid surface 882A may be subsequently sealed over with a material via a variety of known techniques to create such patches. The removal holes 890 may be sealed when it is desirable to have a contained or sealed interior volume, for example, when the interior region 872 is formed of or contains a material that is not compatible with refrigerant and oils in the compressor or a vacuum is present in the voids of the lattice structure 880A. The holes 890 may or may not need to be sealed in the final part, but if so, methods such as soldering, welding, adhesives, and the like may be used.

Another variation of a high-strength light-weight insulating compressor component is non-orbiting scroll component 900 is shown in FIG. 12A. The non-orbiting scroll 900 includes a baseplate 910 having a first side 912 and a second side 914. Vanes 916 define an involute scroll form that extends from the first side 912 of baseplate 910. Non-orbiting scroll 900 includes an annular hub or raised shoulder portion 918 which surrounds the discharge passage 920. An annular recess 922 is also formed in non-orbiting scroll 900 within which a floating seal assembly may be disposed (not shown). A series of outwardly projecting flange portions 924 each of which is provided with an outwardly opening slot (not shown, but which receive a pair of Oldham keys from the Oldham coupling).

A body portion 930 of the orbiting scroll component 900 has at least one core or interior region 932 comprising a lattice structure 940 formed via additive manufacturing. A solid surface 942 is disposed over the lattice structure 940. The lattice structure 940 may be disposed within an interior region 932 of one or more of the baseplate 910, raised shoulder portion 918, and/or the vanes 916 of the involute scroll form. As shown in FIG. 12A, the lattice structure 940 is formed as a continuous region within each of the baseplate 910, annular raised shoulder portion 918, and/or the vanes 916 of the involute scroll form. However, as with any of the other components described herein, discrete compartments or internal regions that are sealed or separated from one another may be formed with different lattice structures or different materials, depending upon mechanical properties required. By way of example, only one of the baseplate 910, annular raised shoulder portion 918, or vanes 916 may include the lattice structure 940 (or some combination thereof), in alternative variations. Notably, there are no removal holes formed in the solid surface 942 for removal of residual or loose powder from the additive manufacturing process. Thus, a plurality of loose particles 944 may be left within the void regions of the lattice structure 940. This may provide additional sound or vibration dampening properties to the non-orbiting scroll component 900. Notably, certain areas may require thicker walls (or thicker solid surfaces 942), for example, solid surface 942 may be thicker on the second side 914 to reinforce the structure, while solid surface 942 may be thinner along the first side 912, including along the surface regions of vanes 916. The scroll vanes 916 are designed for weight reduction with equal or better strength than conventionally formed vanes. The thicker and thinner structures can be printed via the additive manufacturing in the areas where required.

Another variation of a high-strength light-weight insulating compressor component is non-orbiting scroll component 900A is shown in FIG. 12B. The design and components in non-orbiting scroll component 900A are the same as those in non-orbiting scroll component 900 in FIG. 12A, unless otherwise discussed herein. In non-orbiting scroll component 900A, a solid surface 942A is disposed over a lattice structure 940A. However, one or more removal holes 946 are formed in the solid surface 942A for removal of residual or loose powder remaining after the additive manufacturing process. Thus, the lattice structure 940A may have empty void regions. Notably, some loose particles may remain in the voids after the removal process; however a majority of loose and residual particles are removed. In certain aspects, the lattice structure 940A design may provide adequate insulation to sound or vibration so that leaving such particles or introducing another material is not necessary. In other variations, the lattice structure 940A may have empty void regions that are subsequently filled with distinct insulating materials (e.g., solids, gels, foams, liquids, or gases) or negative pressure/vacuum. After removal, the removal holes 946 in the solid surface 942A may be subsequently sealed over with a material via a variety of known techniques to create such patches. The removal holes 946 may be sealed when it is desirable to have a contained or sealed interior volume, for example, when the interior region 932 is formed of or contains a material that is not compatible with refrigerant and oils in the compressor or a vacuum is present in the voids of the lattice structure 940A. The holes 946 may or may not need to be sealed in the final part, but if so, methods such as soldering, welding, adhesives, and the like may be used.

In yet other variations, a partition separator or muffler plate 950 is shown in FIG. 13A. The muffler plate 950 has a body portion 952 with a terminal region 954 that can be welded or attached about its periphery to the compressor housing or shell (not shown). A central discharge port 956 is formed in muffler plate 950 through which pressurized, processed refrigerant can pass after being processed in the compression mechanism of the compressor. In certain conventional hermetically sealed scroll compressors, suction (input or inlet) and discharge (output) is divided by such a separator partition or muffler plate 950. The muffler plate 950 also has an integral region 958 formed therein for receiving an internal pressure relief valve (IPR) and thermal disc (TOD) that can vent excessively high pressured gas from the high pressure discharge chamber to the suction side.

Such a muffler plate 950 is required to exhibit high strength levels, because it defines the divider between discharge chamber and suction pressure and thus must be physically robust and able to withstand large pressure and temperature differentials. When refrigerant enters into the suction or intake chamber (see 596 in FIG. 6), it is at very low temperatures and saturated pressure levels. The ability to isolate a high-pressure side having conditions corresponding to discharge refrigerant that is at high temperatures (e.g., discharge line temperatures) and high pressures (see discharge chamber 524 in FIG. 6) from a low-pressure side having conditions corresponding to suction or refrigerant that is at low temperatures and low pressures, can improve compressor performance. Heat from discharge refrigerant fluid on the high-side can transfer to suction side or low-side, thus increasing suction fluid temperature. When temperature of refrigerant or fluid to be compressed is heated, it has a reduced density serving to reduce mass flow rate and detrimentally affect the compressor cooling capacity and power consumption. By reducing potential heat transfer from discharge or high-side to suction or low-side in accordance with certain principles of the present disclosure, scroll compressor performance and discharge line temperatures can be improved.

The body portion 952 of the muffler plate 950 has at least one core or interior region 962 comprising a lattice structure 960 formed via additive manufacturing. A solid surface 964 is disposed over the lattice structure 960. The lattice structure 960 may be disposed within the interior region 962 of muffler plate 950 and serves to reduce transmission of at least one of thermal energy, sound, or vibration. In preferred aspects, the lattice structure 960 reduces transmission of heat or thermal energy. Certain areas may require thicker walls, for example, the terminal region 954 may be thicker for welding to the compressor housing or shell. The thicker and thinner structures can be printed via the additive manufacturing in the areas where required. Notably, there are no removal holes formed in the solid surface 964 for removal of residual or loose powder from the additive manufacturing process. Thus, a plurality of loose particles 966 may be left within the void regions of the lattice structure 960. This may provide additional thermal, sound, and/or vibration dampening properties to the muffler plate 950.

Another variation of a high-strength light-weight thermally insulating muffler plate 950 is shown in FIG. 13B. The design and components in muffler plate 950A here are the same as those in muffler plate 950 in FIG. 13A, unless otherwise discussed herein. In muffler plate 950A, a solid surface 964A is disposed over a lattice structure 960A. However, one or more removal holes 970 are formed in the solid surface 964A for removal of residual or loose powder remaining after the additive manufacturing process. Thus, the lattice structure 960A may have empty void regions. Notably, some loose particles may remain in the voids after the removal process; however a majority of loose and residual particles are removed. In certain aspects, the lattice structure 960A design may provide adequate thermal insulation (or also sound and/or vibration dampening) so that leaving such particles or introducing another material is not necessary. In other variations, the lattice structure 960A may have empty void regions that are subsequently filled with distinct insulating materials (e.g., solids, gels, foams, liquids, or gases) or negative pressure/vacuum. After removal, the removal holes 970 in the solid surface 964A may be subsequently sealed over with a material via a variety of known techniques to create such patches. The removal holes 970 may be sealed when it is desirable to have a contained or sealed interior volume, for example, when the interior region 962 is formed of or contains a material that is not compatible with refrigerant and oils in the compressor or a vacuum is present in the voids of the lattice structure 960A. The removal holes 970 may or may not need to be sealed in the final part, but if so, methods such as soldering, welding, adhesives, and the like may be used.

In accordance with yet other aspects of the present disclosure, a high-strength light-weight compressor housing or shell 980 is provided in FIG. 14A. The compressor housing or shell 980 is merely an exemplary and representative shell for a scroll compressor. The principles according to the present disclosure are generally applicable to other compressor housing or shell designs. As shown, the shell 980 is a generally cylindrical structure, which can be attached or welded to a cap at the upper end thereof and a lower cover attached or welded to a lower end thereof (not shown). The shell 980 has a compressor inlet 982 defined therein (that receives a fitting not shown) and an electrical terminal 984.

A body portion 986 of the shell 980 has at least one core or interior region 988 comprising a lattice structure 990 formed via additive manufacturing. A solid surface 992 is disposed over the lattice structure 990. The lattice structure 990 may be disposed within the interior region 988 of the shell 980 and serves to reduce transmission of at least one of thermal energy, sound, or vibration. Notably, there are no removal holes formed in the solid surface 992 for removal of residual or loose powder from the additive manufacturing process. Thus, a plurality of loose particles 994 may be left within the void regions of the lattice structure 990. This may provide additional thermal, sound, and/or vibration dampening properties to the shell 980.

Another variation of a high-strength light-weight insulating compressor housing or shell 980A is shown in FIG. 14B. The design and components in shell 980A are the same as those in shell 980 in FIG. 14A, unless otherwise discussed herein. In shell 980A, a solid surface 992A is disposed over a lattice structure 990A. However, one or more removal holes 996 are formed in the solid surface 992A for removal of residual or loose powder remaining after the additive manufacturing process. Thus, the lattice structure 990A may have empty void regions. Some loose particles may remain in the voids after the removal process; however a majority of loose and residual particles are removed. In certain aspects, the lattice structure 990A design may provide adequate sound, vibration, and/or thermal insulation so that leaving such particles or introducing another material is not necessary. In other variations, the lattice structure 990A may have empty void regions that are subsequently filled with distinct insulating materials (e.g., solids, gels, foams, liquids, or gases) or negative pressure/vacuum. After removal, the removal holes 996 in the solid surface 992A may be subsequently sealed over with a material via a variety of known techniques to create such patches. The removal holes 996 may be sealed when it is desirable to have a contained or sealed interior volume, for example, when the interior region 988A is formed of or contains a material that is not compatible with refrigerant and oils in the compressor or a vacuum is present in the voids of the lattice structure 990A. The holes 996 may or may not need to be sealed in the final part, but if so, methods such as soldering, welding, adhesives, and the like may be used.

In yet another variation of the present disclosure, a high-strength light-weight compressor housing bottom or lower cover 1000 is provided in FIG. 15A. The lower cover 1000 is merely an exemplary and representative lower cover for a compressor. The principles according to the present disclosure are generally applicable to other compressor housing designs, including for upper caps. As shown, cover 1000 has a central region 1010 and a terminal region 1012. A contoured member 1014 extends from the central region 1010 towards the terminal region 1012. The contoured member 1014 serves as a bottom cap for the compressor interior above (not shown). In the terminal region 1012, the contoured member 1014 defines a circumferential seat 1016 on which a housing or shell (not shown) may rest and be attached or welded. The contoured member 1014 then terminates at a bottom edge 1018. The terminal region 1012 also includes a stabilizing flange 1020 that provides stability and balance to the compressor.

The cover 1000 has at least one core or interior region 1022 comprising a lattice structure 1030 formed via additive manufacturing. A solid surface 1034 is disposed over the lattice structure 1030. The lattice structure 1030 may be disposed within the interior region 1022 of the lower cover 1000 and serves to reduce transmission of at least one of thermal energy, sound, or vibration. Notably, there are no removal holes formed in the solid surface 1034 for removal of residual or loose powder from the additive manufacturing process. Thus, a plurality of loose particles 1032 may be left within the void regions of the lattice structure 1030. This may provide additional thermal, sound, and/or vibration dampening properties to the cover 1000.

Another variation of a high-strength light-weight insulating compressor lower cover 1000A is shown in FIG. 15B. The design and components in lower cover 1000A are the same as those in lower cover 1000 in FIG. 15A, unless otherwise discussed herein. In cover 1000A, a solid surface 1034A is disposed over a lattice structure 1030A. However, one or more removal holes 1036 are formed in the solid surface 1034A for removal of residual or loose powder remaining after the additive manufacturing process. Thus, the lattice structure 1030A may have empty void regions. Some loose particles may remain in the voids after the removal process; however a majority of loose and residual particles are removed. In certain aspects, the lattice structure 1030A design may provide adequate sound, vibration, and/or thermal insulation so that leaving such particles or introducing another material is not necessary. In other variations, the lattice structure 1030A may have empty void regions that are subsequently filled with distinct insulating materials (e.g., solids, gels, foams, liquids, or gases) or negative pressure/vacuum. After removal, the removal holes 1036 in the solid surface 1034A may be subsequently sealed over with a material via a variety of known techniques to create such patches. The removal holes 1036 may be sealed when it is desirable to have a contained or sealed interior volume, for example, when the interior region 1022A is formed of or contains a material that is not compatible with refrigerant and oils in the compressor or a vacuum is present in the voids of the lattice structure 1030A. The removal holes 1036 may or may not need to be sealed in the final part, but if so, methods such as soldering, welding, adhesives, and the like may be used.

The principles according to the present disclosure are generally applicable to other compressor housing or shell designs. For example, the top cap region 514 can be made from additive manufacturing and may comprise a core lattice structure. Thicker and thinner structures can be printed via the additive manufacturing in the areas where required, such as in weld regions. As discussed above, additive manufacturing can be used to produce thick walled components. Thus, the shell or housing can be designed to meet specific strength requirement and thus can be used to form compressor housing or shell components for high pressure applications. An example would be to provide higher hoop strength than axial strength in the component comprising the lattice structure.

As discussed above, the various insulating lattice structures discussed above may be used in the body portions of a variety of distinct compressor components. The components may have a body portion with at least one interior region comprising a lattice structure formed via additive manufacturing and a surface disposed over the lattice structure. Each component can be optimized for sound, strength, or heat transfer or any combination of these. Thus, at least one interior region comprising the lattice structure minimizes transmission of at least one of thermal energy, sound, or vibration through the component. The components prepared in accordance with certain aspects of the present teachings thus provide light-weight components with strength and robustness to withstand various operating conditions in the scroll compressor.

In certain aspects, a compressor component may be an assembly formed from a first piece or part that is created via additive manufacturing having at least one interior region comprising a lattice structure. The assembly may further comprise other pieces or parts that are created via conventional formation techniques, for example, being wrought, cast, or sintered from a powdered metal in a conventional manner as recognized in the art.

Types of compressors that can incorporate components prepared in accordance with certain aspects of the present disclosure include positive displacement and dynamic compressors. Positive displacement compressors increase refrigerant vapor pressure by reducing the volume of the compression chamber through work applied to the compressor's mechanism. Positive displacement compressors include many styles of compressors currently in use, such as reciprocating, linear. rotary (rolling piston, rotary vane element, single screw, twin screw, centrifugal compressor component), and orbital (scroll or trochoidal). Dynamic compressors increase refrigerant vapor pressure by continuous transfer of kinetic energy from the rotating member to the vapor, followed by conversion of this energy into a pressure rise. Centrifugal compressors function based on these principles.

By way of non-limiting example, in certain variations, the light-weight, high-strength insulating compressor component is optionally selected from the group consisting of: a bearing housing, a main bearing housing, a lower bearing housing, an orbiting scroll component, a non-orbiting scroll component, a housing or a shell, a cap, a cover, a separator plate, a muffler plate, an Oldham coupling, a scroll compressor valve, a drive bushing, an interface region between a shell and stator, a roller element, a rotary vane element, a roller element housing, a screw component, a screw, a gate rotor, a bearing, a centrifugal compressor component, a reciprocating component, a piston, a connecting rod, a crankshaft, a cylinder head, a compressor body, a discus valve, a discus valve retainer, a valve plate, and combinations thereof. Such a component having an internal lattice structure when incorporated into a compressor serves to reduce transmission of at least one of thermal energy, sound, and/or vibration. The lower bearing housing could be made lighter. Also local lattice density modifications could be made to increase or decrease the housing stiffness and improve sound and/or vibration insulating characteristics. This could allow the bearing to be stiff in areas for welding and flexible in the bearing areas to improve alignment robustness and bearing performance.

In certain variations, the compressor may be a scroll compressor and the compressor component may be a scroll compressor component. In certain embodiments, the light-weight, high-strength insulating scroll compressor component is optionally selected from the group consisting of: a bearing housing, a main bearing housing, a lower bearing housing, an orbiting scroll component, a non-orbiting scroll component, a housing or a shell, a cap, a cover, a separator plate, a muffler plate, an Oldham coupling ring, a scroll compressor valve, a drive bushing, an interface region between a shell and stator, a crankshaft, and combinations thereof.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A light-weight, high-strength sound insulating compressor component comprising:
   a body portion having at least one sealed interior region that comprises a metallic lattice structure comprising a plurality of cells formed via additive manufacturing and a surface disposed over the metallic lattice structure, wherein each cell of the plurality comprises a node and a solid structure defining one or more void regions therebetween, the plurality of cells comprising a plurality of first cells comprising a first node and a plurality of second cells comprising a second node, wherein the first node comprises a solid sphere and the second node comprises a hollow sphere, and the plurality of first cells defining a first row having a first major longitudinal axis and the plurality of second cells defining a second row having a second major longitudinal axis, wherein the at least one sealed interior region comprising the lattice structure minimizes transmission of at least one of sound or vibrational energy, the first major longitudinal axis and the second major longitudinal axis are parallel to one another and orthogonal to a primary direction of propagation of the sound or vibrational energy and the body portion thus defines at least one sound insulating region that reduces a transmission of sound or a vibrational energy by greater than or equal to about 30% as compared to transmission of the sound or the vibrational energy through a comparative solid body portion devoid of the at least one sealed interior region that comprises a lattice structure.

2. The light-weight high-strength insulating compressor component of claim 1, wherein each cell of the plurality of cells has a maximum average dimension of greater than or equal to about 0.1 mm to less than or equal to about 10 mm.

3. The light-weight high-strength insulating compressor component of claim 1, wherein the plurality of first cells has a first maximum average dimension and the plurality of second cells has a second maximum dimension, wherein the first maximum average dimension and the second maximum average dimension are distinct from one another to provide a lattice structure having a varying cell density.

4. The light-weight high-strength insulating compressor component of claim 1, wherein the one or more void regions comprises loose residual metal particles or an insulating material disposed therein.

5. The light-weight high-strength insulating compressor component of claim 1, wherein the solid structure of the first plurality of cells has a different thickness from a thickness of the solid structure in the second plurality of cells.

6. The light-weight high-strength insulating compressor component of claim 1, wherein the component has a tensile strength of greater than or equal to about 32,000 psi (about 220 MPa).

7. The light-weight high-strength insulating compressor component of claim 1, wherein each first cell and each second cell are disposed adjacent to one another in an alternating pattern.

8. A light-weight, high-strength insulating scroll compressor component comprising:
a body portion having at least one sealed interior region that comprises a metallic lattice structure comprising a plurality of cells formed via additive manufacturing and a surface disposed over the metallic lattice structure, wherein each cell of the plurality comprises a node and the at least one sealed interior region comprising the lattice structure minimizes transmission of at least one of sound or vibrational energy, wherein the plurality of cells comprises a plurality of first cells comprising a first node and a plurality of second cells comprising a second node, wherein the first node comprises a solid sphere and the second node comprises a hollow sphere, and the plurality of first cells defining a first row having a first major longitudinal axis and the plurality of second cells defining a second row having a second major longitudinal axis, the first major longitudinal axis and the second major longitudinal axis are parallel to one another and orthogonal to a primary direction of propagation of the sound or vibrational energy and the body portion thus defines at least one sound insulating region that reduces a transmission of sound or a vibrational energy by greater than or equal to about 30% as compared to transmission of the sound or the vibrational energy through a comparative solid body portion devoid of the at least one sealed interior region that comprises a lattice structure, wherein the light-weight, high-strength insulating scroll compressor component is selected from the group consisting of: a bearing housing, a main bearing housing, a lower bearing housing, an orbiting scroll component, a non-orbiting scroll component, a housing or a shell, a cap, a cover, a separator plate, a muffler plate, an Oldham coupling, a scroll compressor valve, a drive bushing, a bearing, a crankshaft, and combinations thereof.

9. The light-weight high-strength insulating scroll compressor component of claim 8, wherein the component has a tensile strength of greater than or equal to about 32,000 psi (about 220 MPa).

10. The light-weight high-strength insulating scroll compressor component of claim 8, wherein the at least one sealed interior region forms a thermally insulating sealed region having a thermal conductivity (K) of less than or equal to about 300 mW/m·K at standard temperature and pressure conditions.

* * * * *